US012606157B2

(12) United States Patent
Park

(10) Patent No.: US 12,606,157 B2
(45) Date of Patent: Apr. 21, 2026

(54) APPARATUS FOR CONTROLLING A VEHICLE AND METHOD THEREOF

(71) Applicants:HYUNDAI MOTOR COMPANY, Seoul (KR); KIA CORPORATION, Seoul (KR)

(72) Inventor: Jae Il Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 43 days.

(21) Appl. No.: 18/652,351

(22) Filed: May 1, 2024

(65) Prior Publication Data

US 2025/0153707 A1 May 15, 2025

(30) Foreign Application Priority Data

Nov. 9, 2023 (KR) ........................ 10-2023-0154839

(51) Int. Cl.
*B60W 30/02* (2012.01)
*B60L 3/00* (2019.01)
(Continued)

(52) U.S. Cl.
CPC ........... *B60W 30/02* (2013.01); *B60L 3/0007* (2013.01); *B60W 30/095* (2013.01); *B60W 50/14* (2013.01); *B60W 2050/0008* (2013.01); *B60W 2050/0012* (2013.01); *B60W 2520/125* (2013.01); *B60W 2520/14* (2013.01); *B60W 2520/18* (2013.01); *B60W 2540/18* (2013.01); *B60W 2552/40* (2020.02)

(58) Field of Classification Search
None
See application file for complete search history.

(56) References Cited

U.S. PATENT DOCUMENTS 6,711,484 B2 3/2004 Kifuku et al.
7,171,296 B2 * 1/2007 Kato ..................... B60W 10/18
701/87
(Continued)

FOREIGN PATENT DOCUMENTS

CN 103153728 A * 6/2013 .......... B60T 8/17555
CN 103448716 A * 12/2013
(Continued)

*Primary Examiner* — Kevin R Steckbauer
(74) *Attorney, Agent, or Firm* — MCDONNELL BOEHNEN HULBERT & BERGHOFF LLP

(57) ABSTRACT

A vehicle control device includes a processor and a drive motor. The processor may identify whether a host vehicle is in situation where the host vehicle is avoiding a collision, identify a first control amount and a second control amount, and adjust a front wheel control amount, or a rear wheel control amount, such that the front wheel control amount and the rear wheel control amount fall within the specified control amount range based on the front wheel control amount which is identified according to the first control amount and the second control amount and is a control amount of a drive motor that controls the front wheel, the rear wheel control amount which is identified according to the first control amount and the second control amount and is a control amount of a drive motor that controls the rear wheel, and the specified control amount range.

20 Claims, 11 Drawing Sheets

(51) Int. Cl.
    *B60W 30/095*      (2012.01)
    *B60W 50/00*      (2006.01)
    *B60W 50/14*      (2020.01)

(56) References Cited

U.S. PATENT DOCUMENTS

| | | | | |
|---|---|---|---|---|
| 7,987,029 | B2 * | 7/2011 | Takenaka | B62D 6/04 |
| | | | | 116/36 |
| 8,024,091 | B2 * | 9/2011 | Takenaka | B60W 50/06 |
| | | | | 701/72 |
| 8,027,775 | B2 * | 9/2011 | Takenaka | B60W 40/10 |
| | | | | 701/70 |
| 8,086,383 | B2 * | 12/2011 | Takenaka | B60T 8/17552 |
| | | | | 116/36 |
| 8,783,390 | B2 * | 7/2014 | Maeda | B60G 17/0195 |
| | | | | 180/242 |
| 8,983,723 | B2 * | 3/2015 | Katsuyama | B60L 15/20 |
| | | | | 303/189 |
| 9,227,637 | B2 * | 1/2016 | Nakatsu | B60W 10/08 |
| 9,233,689 | B2 * | 1/2016 | Nakatsu | B60W 10/08 |
| 9,457,804 | B2 * | 10/2016 | Katsuyama | B60W 10/22 |
| 9,573,595 | B2 * | 2/2017 | Fairgrieve | B60W 10/20 |
| 10,518,771 | B2 * | 12/2019 | Fairgrieve | B60W 10/04 |
| 10,836,377 | B2 * | 11/2020 | Lee | B60T 8/17554 |
| 10,994,725 | B2 * | 5/2021 | Yajima | B60W 30/09 |
| 11,370,414 | B2 * | 6/2022 | Takei | B60W 10/22 |
| 11,794,590 | B2 * | 10/2023 | Hwang | B60W 10/192 |
| 12,097,772 | B2 * | 9/2024 | Trainham | B62D 9/002 |
| 2002/0032512 | A1 * | 3/2002 | Shimada | B60W 10/08 |
| | | | | 903/917 |
| 2003/0069675 | A1 | 4/2003 | Kifuku et al. | |
| 2005/0125131 | A1 * | 6/2005 | Kato | B60T 8/172 |
| | | | | 701/70 |
| 2009/0108671 | A1 * | 4/2009 | Maeda | B60W 30/04 |
| | | | | 303/146 |
| 2009/0118905 | A1 * | 5/2009 | Takenaka | B62D 6/04 |
| | | | | 701/41 |
| 2009/0171526 | A1 * | 7/2009 | Takenaka | B60W 40/101 |
| | | | | 701/70 |
| 2009/0187302 | A1 * | 7/2009 | Takenaka | B62D 6/04 |
| | | | | 701/33.8 |
| 2009/0319114 | A1 * | 12/2009 | Takenaka | B60W 10/04 |
| | | | | 701/48 |
| 2013/0218388 | A1 * | 8/2013 | Katsuyama | B60L 50/51 |
| | | | | 701/22 |
| 2015/0100205 | A1 * | 4/2015 | Katsuyama | B60L 3/10 |
| | | | | 701/37 |
| 2015/0105978 | A1 * | 4/2015 | Nakatsu | B60W 10/22 |
| | | | | 701/37 |
| 2015/0158493 | A1 * | 6/2015 | Nakatsu | B60W 10/22 |
| | | | | 701/22 |
| 2015/0232093 | A1 * | 8/2015 | Fairgrieve | B60W 10/18 |
| | | | | 701/90 |
| 2016/0089982 | A1 | 3/2016 | Ienaga | |
| 2017/0158201 | A1 * | 6/2017 | Fairgrieve | B60W 10/06 |
| 2019/0283733 | A1 * | 9/2019 | Takei | B60G 17/0195 |
| 2019/0308611 | A1 * | 10/2019 | Lee | B60W 40/109 |
| 2019/0375398 | A1 * | 12/2019 | Yajima | B60W 10/119 |
| 2021/0206430 | A1 * | 7/2021 | North | B62D 11/04 |

| | | | | |
|---|---|---|---|---|
| 2022/0041068 | A1 * | 2/2022 | Park | B60L 3/10 |
| 2022/0063420 | A1 | 3/2022 | Yoon | |
| 2022/0080838 | A1 * | 3/2022 | Hwang | B60W 40/101 |
| 2023/0021908 | A1 * | 1/2023 | Trainham | B60L 15/2036 |
| 2024/0227820 | A1 * | 7/2024 | Takebayashi | B60W 50/0097 |
| 2025/0153707 | A1 * | 5/2025 | Park | B60W 30/02 |

FOREIGN PATENT DOCUMENTS

| | | | | | |
|---|---|---|---|---|---|
| CN | 101472754 | B | * | 3/2014 | B60W 30/188 |
| CN | 104512276 | A | * | 4/2015 | B60W 10/08 |
| CN | 104520138 | A | * | 4/2015 | B60L 7/14 |
| CN | 104554265 | A | * | 4/2015 | B60W 10/08 |
| CN | 103153728 | B | * | 9/2015 | B60T 8/17555 |
| CN | 104520138 | B | * | 9/2016 | B60L 7/14 |
| CN | 104512276 | B | * | 4/2017 | B60W 10/08 |
| CN | 104554265 | B | * | 4/2017 | B60W 10/08 |
| CN | 108128306 | A | * | 6/2018 | B60W 30/18036 |
| CN | 110281723 | A | * | 9/2019 | B60W 30/02 |
| CN | 108128306 | B | * | 3/2020 | B60W 40/105 |
| CN | 109291932 | B | * | 3/2021 | B60W 40/105 |
| CN | 111114344 | B | * | 5/2021 | B60W 30/02 |
| CN | 116461496 | A | * | 7/2023 | B60W 30/04 |
| CN | 117465419 | A | * | 1/2024 | B60W 30/04 |
| CN | 119749694 | A | * | 4/2025 | |
| DE | 102009007356 | A1 | * | 8/2010 | B60G 17/0162 |
| DE | 102009007357 | A1 | * | 8/2010 | B60G 17/0195 |
| DE | 102014219899 | A1 | * | 4/2015 | B60W 10/08 |
| DE | 102014220869 | A1 | * | 4/2015 | B60W 10/08 |
| DE | 102010017647 | B4 | * | 5/2017 | B60T 8/17554 |
| DE | 102019114811 | A1 | * | 12/2019 | B60W 40/02 |
| EP | 1520761 | A2 | * | 4/2005 | B60T 8/172 |
| EP | 2868506 | A2 | * | 5/2015 | B60W 30/188 |
| EP | 2868507 | A2 | * | 5/2015 | B60W 30/188 |
| JP | 2005-020830 | A | | 1/2005 | |
| JP | 2005014657 | A | * | 1/2005 | |
| JP | 2005-073458 | A | | 3/2005 | |
| JP | 2005306284 | A | * | 11/2005 | |
| JP | 2007-168641 | A | | 7/2007 | |
| JP | 2008005635 | A | * | 1/2008 | B60W 30/188 |
| JP | 2008167640 | A | * | 7/2008 | |
| JP | 4143111 | B2 | * | 9/2008 | B62D 6/04 |
| JP | 4143113 | B2 | * | 9/2008 | B60W 50/06 |
| JP | 2008260439 | A | * | 10/2008 | |
| JP | 4179348 | B2 | * | 11/2008 | B60W 30/188 |
| JP | 2015071362 | A | * | 4/2015 | B60W 10/08 |
| JP | 2015080323 | A | * | 4/2015 | B60W 10/08 |
| JP | 5862636 | B2 | * | 2/2016 | B60W 10/08 |
| JP | 5880887 | B2 | * | 3/2016 | B60W 10/08 |
| JP | 2017-060351 | A | | 3/2017 | |
| JP | 2018131088 | A | * | 8/2018 | |
| JP | 2019182104 | A | * | 10/2019 | |
| JP | 6944130 | B2 | * | 10/2021 | B60G 17/016 |
| KR | 2003-0030833 | A | | 4/2003 | |
| KR | 100837234 | B1 | * | 6/2008 | |
| KR | 20090026770 | A | * | 3/2009 | B60W 40/10 |
| KR | 101083946 | B1 | * | 11/2011 | B60W 40/10 |
| KR | 20190076346 | A | * | 7/2019 | B60W 10/119 |
| KR | 20250068391 | A | * | 5/2025 | B60L 3/102 |
| WO | WO-2007148225 | A2 | * | 12/2007 | B60W 40/10 |
| WO | WO-2012052831 | A1 | * | 4/2012 | B60T 8/17555 |
| WO | WO-2023127444 | A1 | * | 7/2023 | B60W 40/114 |

* cited by examiner 301                              303

501

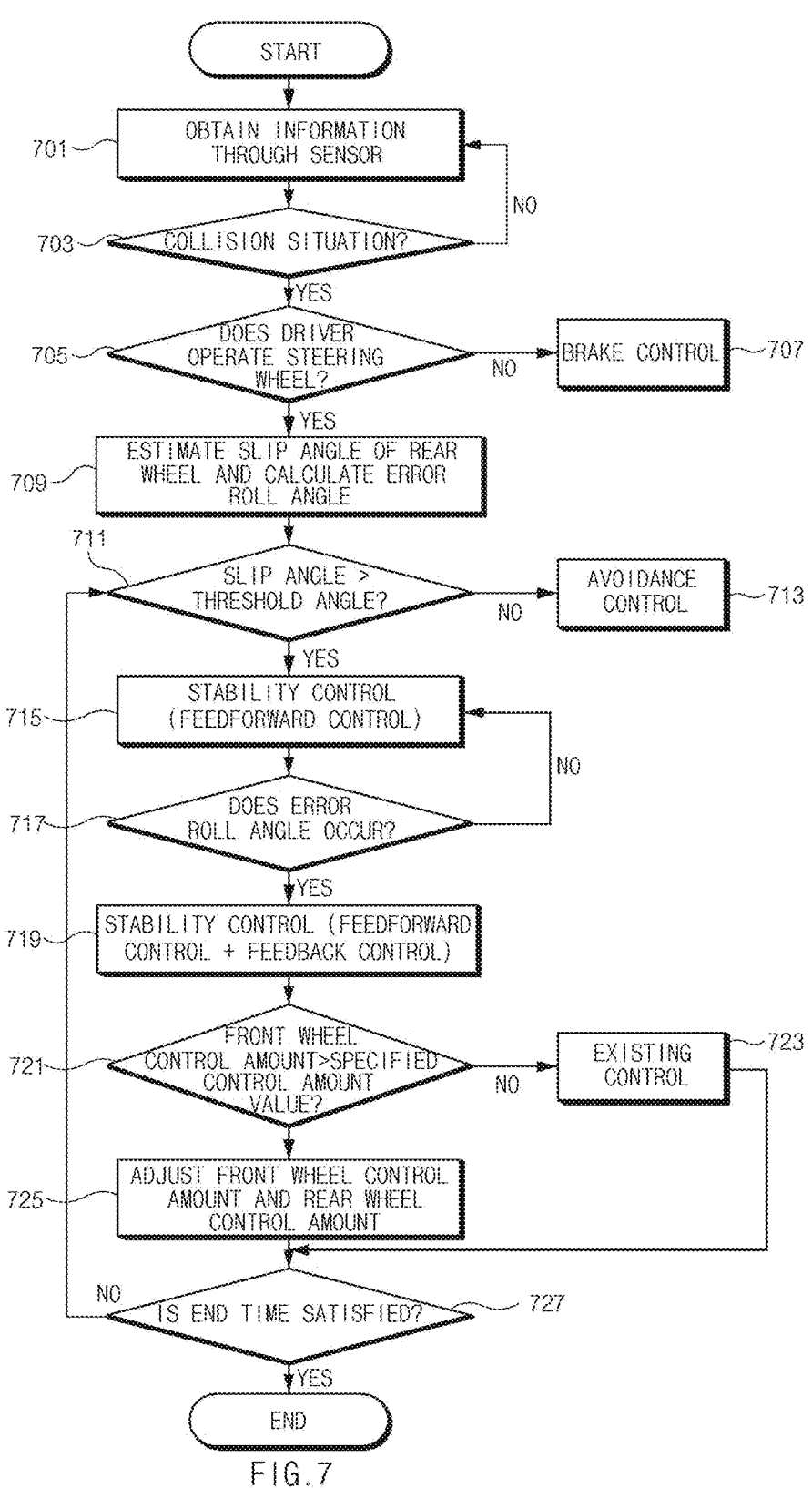

START

701 — OBTAIN INFORMATION THROUGH SENSOR

703 — COLLISION SITUATION? — NO

YES

705 — DOES DRIVER OPERATE STEERING WHEEL? — NO → BRAKE CONTROL — 707

YES

709 — ESTIMATE SLIP ANGLE OF REAR WHEEL AND CALCULATE ERROR ROLL ANGLE

711 — SLIP ANGLE > THRESHOLD ANGLE? — NO → AVOIDANCE CONTROL — 713

YES

715 — STABILITY CONTROL (FEEDFORWARD CONTROL)

717 — DOES ERROR ROLL ANGLE OCCUR? — NO

YES

719 — STABILITY CONTROL (FEEDFORWARD CONTROL + FEEDBACK CONTROL)

721 — FRONT WHEEL CONTROL AMOUNT>SPECIFIED CONTROL AMOUNT VALUE? — NO → EXISTING CONTROL — 723

725 — ADJUST FRONT WHEEL CONTROL AMOUNT AND REAR WHEEL CONTROL AMOUNT

NO — IS END TIME SATISFIED? — 727

YES

END

FIG.7

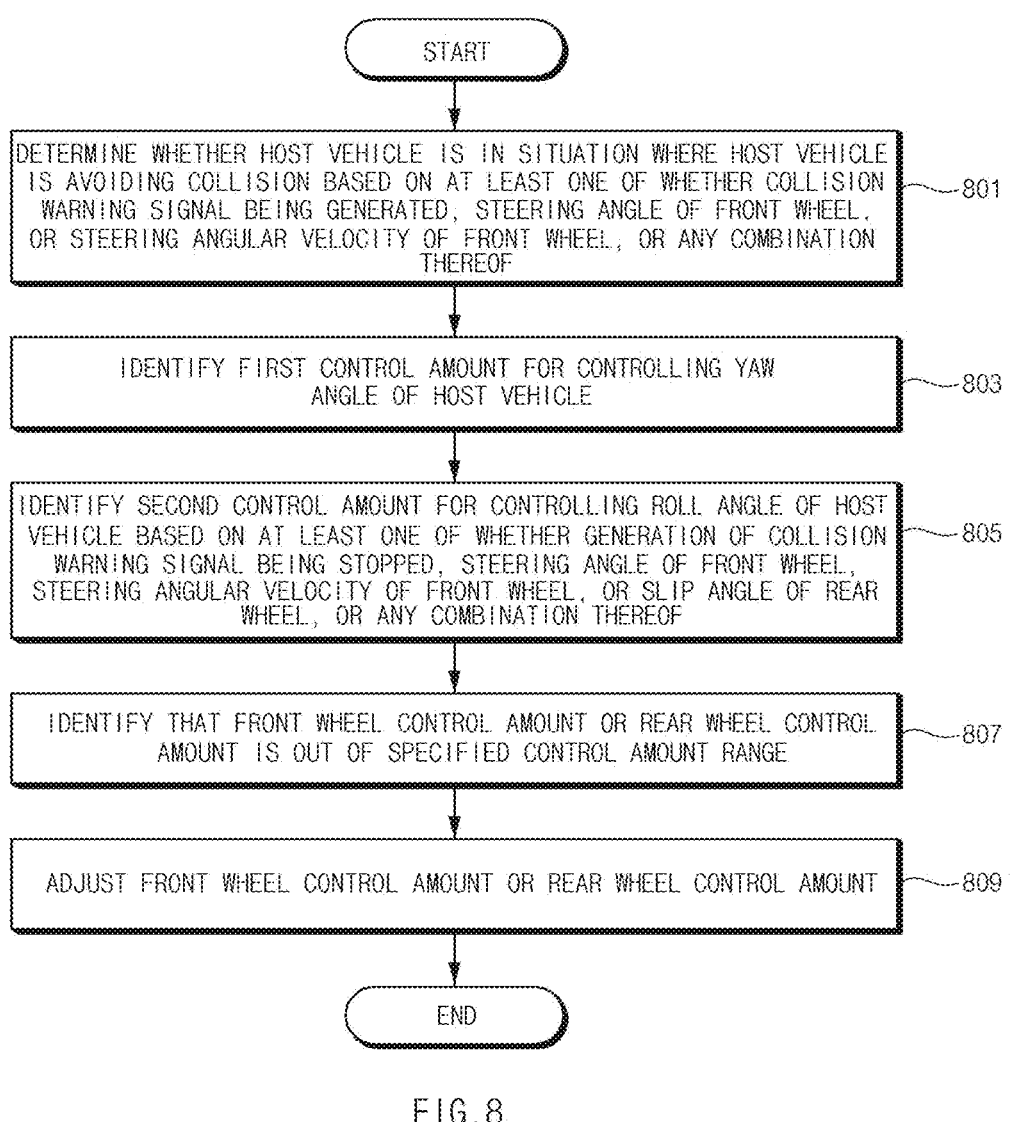

START

DETERMINE WHETHER HOST VEHICLE IS IN SITUATION WHERE HOST VEHICLE IS AVOIDING COLLISION BASED ON AT LEAST ONE OF WHETHER COLLISION WARNING SIGNAL BEING GENERATED, STEERING ANGLE OF FRONT WHEEL, OR STEERING ANGULAR VELOCITY OF FRONT WHEEL, OR ANY COMBINATION THEREOF — 801

IDENTIFY FIRST CONTROL AMOUNT FOR CONTROLLING YAW ANGLE OF HOST VEHICLE — 803

IDENTIFY SECOND CONTROL AMOUNT FOR CONTROLLING ROLL ANGLE OF HOST VEHICLE BASED ON AT LEAST ONE OF WHETHER GENERATION OF COLLISION WARNING SIGNAL BEING STOPPED, STEERING ANGLE OF FRONT WHEEL, STEERING ANGULAR VELOCITY OF FRONT WHEEL, OR SLIP ANGLE OF REAR WHEEL, OR ANY COMBINATION THEREOF — 805

IDENTIFY THAT FRONT WHEEL CONTROL AMOUNT OR REAR WHEEL CONTROL AMOUNT IS OUT OF SPECIFIED CONTROL AMOUNT RANGE — 807

ADJUST FRONT WHEEL CONTROL AMOUNT OR REAR WHEEL CONTROL AMOUNT — 809

END

FIG.8

APPARATUS FOR CONTROLLING A VEHICLE AND METHOD THEREOF

CROSS REFERENCE TO RELATED APPLICATIONS

This application claims the benefit of priority to Korean Patent Application No. 10-2023-0154839, filed in the Korean Intellectual Property Office on Nov. 9, 2023, the entire contents of which are incorporated herein by reference.

TECHNICAL FIELD

The present disclosure relates to a vehicle control device and a method thereof, and more particularly to a technique for controlling a drive motor for avoiding a collision with another object and for increasing operational stability after the collision has been avoided.

BACKGROUND

In recent years, as the problems of climate change and environmental pollution have intensified, technological developments have been made for electric vehicles with low carbon emissions and low fossil fuel consumption.

An electric vehicle refers to a vehicle that charges electric energy from an external power source through a battery included in the vehicle, and uses the charged electric energy for operation. An electric vehicle may operate a drive motor by using stored electrical energy. The electric vehicle may perform control to rotate front and rear wheels through the drive motor.

The electric vehicle may have a plurality of drive motors internally as part or all of the powertrain of a conventional internal combustion engine vehicle, such as the engine, is removed or converted, and the powertrain is miniaturized. If the electric vehicle includes a plurality of drive motors, the electric vehicle may control the rotation of the front wheels and the rotation of the rear wheels independently of each other.

Techniques for controlling the rotation of the front wheels and the rotation of the rear wheels independently of each other are being investigated to control the electric vehicle closer to a driver's intention and to improve operational stability.

SUMMARY

The present disclosure has been made to solve the above-mentioned problems occurring in the prior art while advantages achieved by the prior art are maintained intact.

An aspect of the present disclosure provides a vehicle control device and method for identifying a control amount of a drive motor that controls a front wheel and a control amount of a drive motor that controls a rear wheel to control a yaw angle and a roll angle in an electric vehicle.

An aspect of the present disclosure provides a vehicle control device and method for adjusting a control amount of a drive motor that controls a front wheel and a control amount of a drive motor that controls a rear wheel to control the drive motors within a specified control amount range in an electric vehicle.

An aspect of the present disclosure provides a vehicle control device and method for improving collision avoidance performance of operation for avoiding a collision of an electric vehicle.

An aspect of the present disclosure provides a vehicle control device and method for improving the operational stability of a host vehicle after a collision avoidance operation of an electric vehicle.

An aspect of the present disclosure provides a vehicle control device and method for improving collision avoidance performance and operational stability together by adjusting a control amount of a drive motor according to the progress of operation for avoiding a collision and stabilizing the operation of a host vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control device includes a processor and a drive motor.

According to an embodiment, the processor may identify whether a host vehicle avoids a collision based on at least one of whether a collision warning signal is generated, a steering angle of a front wheel included in the host vehicle, or a steering angular velocity of the front wheel, or any combination thereof, identify a first control amount for controlling a yaw angle of the host vehicle based on a speed of the host vehicle, identify a second control amount for controlling a roll angle of the host vehicle according to at least one of a lateral acceleration of the host vehicle, a coefficient of friction between ground and the front wheel, a coefficient of friction between the ground and a rear wheel, a speed of the host vehicle, or the steering angle of the front wheel, or any combination thereof based on at least one of whether generation of the collision warning signal is stopped after the host vehicle avoids the collision, the steering angle of the front wheel, the steering angular velocity of the front wheel, or a slip angle of the rear wheel, or any combination thereof, and adjust a front wheel control amount or a rear wheel control amount, such that the front wheel control amount and the rear wheel control amount are within a specified control amount range based on the front wheel control amount which is identified according to the first control amount and the second control amount and is a control amount of a drive motor that controls the front wheel, the rear wheel control amount which is identified according to the first control amount and the second control amount and is a control amount of a drive motor that controls the rear wheel, and the specified control amount range.

According to an embodiment, the processor may further identify a feedforward control amount, which is a control amount of a drive motor for feedforward control according to at least one of the lateral acceleration of the host vehicle, a centripetal force received by the front wheel, or a centripetal force received by the rear wheel, or any combination thereof, further identify a feedback control amount, which is a control amount of a drive motor for feedback control according to at least one of a target roll angle which is a goal in controlling the roll angle of the host vehicle, or an estimated roll angle for controlling the roll angle of the host vehicle, or any combination thereof, and further identify the second control amount based on a value obtained by adding the feedforward control amount and the feedback control amount.

According to an embodiment, the processor may further identify the control amount of the drive motor for the feedback control such that the control amount of the drive motor for the feedback control is proportional to a difference between the target roll angle and the estimated roll angle, and a difference between a target roll angular acceleration, which is an amount of change in the target roll angle over time, and an estimated roll angular acceleration, which is the amount of change in the estimated roll angle over time.

According to an embodiment, the processor may further identify the feedforward control amount such that the feedforward control amount is proportional to the estimated roll angle, which is proportional to the lateral acceleration of the host vehicle and inversely proportional to a value obtained by adding the centripetal force received by the front wheel and the centripetal force received by the rear wheel. The centripetal force received by the front wheel may be inversely proportional to the coefficient of friction between the ground and the front wheel, and proportional to an absolute value of the lateral acceleration of the host vehicle. The centripetal force received by the rear wheel may be inversely proportional to the coefficient of friction between the ground and the rear wheel, and proportional to the absolute value of the lateral acceleration of the host vehicle.

According to an embodiment, the processor may further identify the target roll angle based on the speed of the host vehicle, and the steering angle of the front wheel, and identify the estimated roll angle based on the lateral acceleration of the host vehicle, the centripetal force received by the front wheel, and the centripetal force received by the rear wheel.

According to an embodiment, the processor may further identify the front wheel control amount based on a value obtained by adding an absolute value of the first control amount and an absolute value of the second control amount, and identify the rear wheel control amount based on a value obtained by subtracting the absolute value of the second control amount from the absolute value of the first control amount based on a value identified based on at least one of the steering angle of the front wheel, or the steering angular velocity of the front wheel, or any combination thereof being out of a specified range after the host vehicle avoids the collision, generation of the collision warning signal being stopped, and the slip angle of the rear wheel being greater than a threshold angle, and identify the first control amount as the front wheel control amount and the rear wheel control amount, based on a value identified based on at least one of the steering angle of the front wheel, or the steering angular velocity of the front wheel, or any combination thereof being out of the specified range after the host vehicle avoids the collision, the generation of the collision warning signal being not stopped, or the slip angle of the rear wheel being less than or equal to the threshold angle.

According to an embodiment, the processor may further identify the front wheel control amount based on a value obtained by adding an absolute value of the first control amount and an absolute value of the second control amount, identify the rear wheel control amount based on a value obtained by subtracting the absolute value of the second control amount from the absolute value of the first control amount, specify the specified control amount range to be less than or equal to a specified control amount value, adjust the front wheel control amount greater than the specified control amount value to be less than or equal to the specified control amount value if the front wheel control amount is greater than the specified control amount value, and adjust the rear wheel control amount such that a difference between the front wheel control amount and the rear wheel control amount is maintained by adding the rear wheel control amount and a value obtained by subtracting the front wheel control amount after the adjustment from the front wheel control amount before the adjustment.

According to an embodiment, the processor may further identify when the host vehicle avoids the collision and when an operation of the host vehicle is stabilized has ended based on a value, which is identified based on at least one of the steering angle of the front wheel, or the steering angular velocity of the front wheels, or any combination thereof, falling within the specified range, a yaw angular velocity which is the velocity at which the yaw angle changes, falling within a specified yaw angular velocity range continuously for a certain period of time, or generation of a collision waring signal being stopped.

According to an embodiment, the processor may further detect an object different from the host vehicle and located in front of the host vehicle, based on at least one of a LIDAR, or a camera, or any combination thereof, and generate a collision warning signal based on detecting the object.

According to an embodiment, the processor may further rotate the rear wheel in a direction opposite to a direction in which the front wheel rotates, if the front wheel control amount, or the rear wheel control amount, is within the specified control amount range, and an absolute value of the second control amount is greater than an absolute value of the first control amount.

According to an aspect of the present disclosure, a vehicle control method includes identifying, by a processor, whether a host vehicle avoids a collision based on at least one of whether a collision warning signal is generated, a steering angle of a front wheel included in the host vehicle, or a steering angular velocity of the front wheel, or any combination thereof, identifying a first control amount for controlling a yaw angle of the host vehicle based on a speed of the host vehicle, identifying a second control amount for controlling a roll angle of the host vehicle according to at least one of a lateral acceleration of the host vehicle, a coefficient of friction between ground and the front wheel, a coefficient of friction between the ground and a rear wheel, a speed of the host vehicle, or the steering angle of the front wheel, or any combination thereof based on at least one of whether generation of the collision warning signal is stopped after the situation where the host vehicle is avoiding the collision, the steering angle of the front wheel, the steering angular velocity of the front wheel, or a slip angle of the rear wheel, or any combination thereof, and adjusting a front wheel control amount or a rear wheel control amount, such that the front wheel control amount and the rear wheel control amount fall within a specified control amount range based on the front wheel control amount which is identified according to the first control amount and the second control amount and is a control amount of a drive motor that controls the front wheel, the rear wheel control amount which is identified according to the first control amount and the second control amount and is a control amount of a drive motor that controls the rear wheel, and the specified control amount range.

According to an embodiment, the identifying of the second control amount may include identifying a feedforward control amount, which is a control amount of a drive motor for feedforward control according to at least one of the lateral acceleration of the host vehicle, a centripetal force received by the front wheel, or a centripetal force received by the rear wheel, or any combination thereof, identifying a feedback control amount, which is a control amount of a drive motor for feedback control according to at least one of a target roll angle which is a goal in controlling the roll angle of the host vehicle, or an estimated roll angle for controlling the roll angle of the host vehicle, or any combination thereof, and identifying the second control amount based on a value obtained by adding the feedforward control amount and the feedback control amount.

According to an embodiment, the identifying the feedback control amount may include identifying the control amount of the drive motor for the feedback control such that the control amount of the drive motor for the feedback control is proportional to a difference between the target roll angle and the estimated roll angle, and a difference between a target roll angular acceleration, which is an amount of change in the target roll angle over time, and an estimated roll angular acceleration, which is the amount of change in the estimated roll angle over time.

According to an embodiment the identifying the feedforward control amount may include identifying the feedforward control amount such that the feedforward control amount is proportional to the estimated roll angle, which is proportional to the lateral acceleration of the host vehicle and inversely proportional to a value obtained by adding the centripetal force received by the front wheel and the centripetal force received by the rear wheel. The centripetal force received by the front wheel may be inversely proportional to the coefficient of friction between the ground and the front wheel, and proportional to an absolute value of the lateral acceleration of the host vehicle. The centripetal force received by the rear wheel may be inversely proportional to the coefficient of friction between the ground and the rear wheel, and proportional to an absolute value of the lateral acceleration of the host vehicle.

According to an embodiment the identifying the feedback control amount may include identifying the target roll angle based on the speed of the host vehicle and the steering angle of the front wheel, and identifying the estimated roll angle based on the lateral acceleration of the host vehicle, the centripetal force received by the front wheel, and the centripetal force received by the rear wheel.

According to an embodiment, the vehicle control method may further include identifying the front wheel control amount based on a value obtained by adding an absolute value of the first control amount and an absolute value of the second control amount, and identifying the rear wheel control amount based on a value obtained by subtracting the absolute value of the second control amount from the absolute value of the first control amount based on a value identified based on at least one of the steering angle of the front wheel, or the steering angular velocity of the front wheel, or any combination thereof being out of a specified range after the host vehicle avoids the collision, generation of the collision warning signal being stopped, and the slip angle of the rear wheel being greater than a threshold angle, and identifying the first control amount as the front wheel control amount and the rear wheel control amount based on a value identified based on at least one of the steering angle of the front wheel, or the steering angular velocity of the front wheel, or any combination thereof being out of the specified range after the host vehicle avoids a collision, the generation of the collision warning signal being not stopped, or the slip angle of the rear wheel being less than or equal to the threshold angle.

According to an embodiment, adjusting the front wheel control amount, or the rear wheel control amount may include identifying the front wheel control amount based on a value obtained by adding an absolute value of the first control amount and an absolute value of the second control amount, identifying the rear wheel control amount based on a value obtained by subtracting the absolute value of the second control amount from the absolute value of the first control amount, specifying the specified control amount range to be less than or equal to a specified control amount value, adjusting the front wheel control amount greater than the specified control amount value to be less than or equal to the specified control amount value if the front wheel control amount is greater than the specified control amount value, and adjusting the rear wheel control amount such that a difference between the front wheel control amount and the rear wheel control amount is maintained by adding the rear wheel control amount and a value obtained by subtracting the front wheel control amount after the adjustment from the front wheel control amount before the adjustment.

According to an embodiment, the vehicle control method may further include identifying when the host vehicle avoids the collision and when an operation of the host vehicle is stabilized has ended based on a value, which is identified based on at least one of the steering angle of the front wheel, or the steering angular velocity of the front wheels, or any combination thereof, falling within the specified range, a yaw angular velocity which is the velocity at which the yaw angle changes, falling within a specified yaw angular velocity range continuously for a certain period of time, or generation of a collision waring signal being stopped.

According to an embodiment, the identifying whether the host vehicle is avoiding the collision may include detecting an object different from the host vehicle and located in front of the host vehicle, based on at least one of a LIDAR, or a camera, or any combination thereof, and generating a collision warning signal based on detecting the object.

According to an embodiment, the vehicle control method may further include rotating the rear wheel in a direction opposite to a direction in which the front wheel rotates, if the front wheel control amount, or the rear wheel control amount, falls within the specified control amount range, and an absolute value of the second control amount is greater than an absolute value of the first control amount.

BRIEF DESCRIPTION OF THE FIGURES

The above and other objects, features and advantages of the present disclosure will be more apparent from the following detailed description taken in conjunction with the accompanying drawings:

FIG. 7 illustrates a flow chart of operation of a vehicle control device for performing operation of avoiding a collision and stabilizing the operation of a host vehicle, in a vehicle control device or a vehicle control method according to one embodiment of the present disclosure;

FIG. 8 illustrates a flow chart of operation of a vehicle control device for adjusting a control amount of the drive motor 105, in a vehicle control device, or a vehicle control method, according to one embodiment of the present disclosure;

DETAILED DESCRIPTION

Figure 1:
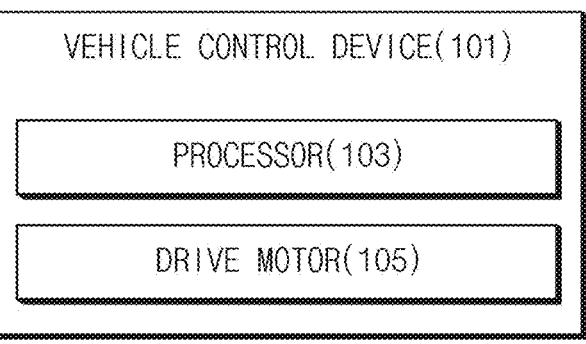
FIG. 1 is a block diagram showing the configuration of a vehicle control device according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even if they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In addition, in the present disclosure, the expressions "greater than" or "less than" may be used to indicate whether a specific condition is satisfied or fulfilled, but are used only to indicate examples, and do not exclude "greater than or equal to" or "less than or equal to". A condition indicating "greater than or equal to" may be replaced with "greater than", a condition indicating "less than or equal to" may be replaced with "less than", a condition indicating "greater than or equal to and less than" may be replaced with "greater than and less than or equal to". In addition, 'A' to 'B' means at least one of elements from A (including A) to B (including B).

Hereinafter, embodiments of the present disclosure will be described in detail with reference to FIGS. 1 to 11.

FIG. 1 is a block diagram showing the configuration of a vehicle control device according to an embodiment of the present disclosure.

A vehicle control device 101 according to an embodiment of the present disclosure may be implemented inside or outside a vehicle, and some of components included in the vehicle control device 101 may be implemented inside or outside the vehicle.

Referring to FIG. 1, the vehicle control device 101 may include a processor 103 and a drive motor 105. At least one of the processor 103, or the drive motor 105, or any combination thereof may be electronically and/or operably coupled with each other by an electronic component, such as a communication bus.

According to an embodiment, hereinafter, combining pieces of hardware operatively may mean a direct connection or an indirect connection between the pieces of hardware being established in a wired or wireless manner such that first hardware of the pieces of hardware controls second hardware of the pieces of hardware. The type and/or number of hardware included in the vehicle control device 101 is not limited to that shown in FIG. 1. For example, the vehicle control device 101 may include only some of hardware components shown in FIG. 1.

A driver of the vehicle control device 101 may operate a steering wheel to avoid collision with an object located in front of a host vehicle. The operating speed of the steering wheel to avoid collision may be greater than a specified operating speed. In other words, the steering wheel may be operated sharply to avoid collision. A yaw angle and roll angle of the host vehicle may be changed according to the operation of the steering wheel to avoid collision. According to an existing vehicle control device, if a yaw angle becomes greater than a specified yaw angle according to the operation of the steering wheel, it may be difficult to control the driving direction of the host vehicle after avoiding a collision. According to the existing vehicle control device, if a roll angle becomes greater than a specified roll angle according to the operation of the steering wheel, the host vehicle may overturn after avoiding a collision.

The vehicle control device 101 according to an embodiment may differently identify the control amount of the drive motor 105 that controls front wheels and the control amount of the drive motor 105 that controls rear wheels to improve collision avoidance performance and ensure operational stability of the host vehicle even after avoiding a collision. The control amount of the drive motor 105 that controls the front wheels may hereinafter be referred to as a front wheel control amount. The control amount of the drive motor 105 that controls the rear wheels may hereinafter be referred to as a rear wheel control amount.

According to an embodiment, the processor 103 of the vehicle control device 101 may identify whether the host vehicle is in situation where the host vehicle is avoiding a collision to identify whether there is a need to improve collision avoidance performance and ensure the operational stability of the host vehicle.

According to an embodiment, the processor 103 of the vehicle control device 101 may detect an object (e.g. a preceding vehicle or a traffic light) different from the host vehicle located in front of the host vehicle through a forward collision avoidance system, based on at least one of a LIDAR, or a camera, or any combination thereof. The processor 103 of the vehicle control device 101 may generate a collision waring signal based on detecting an object, that is different from the host vehicle, located in front of the host vehicle through the forward collision avoidance system. The forward collision avoidance system may be referred to as forward collision avoidance assist (FCA).

According to an embodiment, the processor 103 of the vehicle control device 101 may determine whether the host vehicle is in situation where the host vehicle is avoiding a collision, based on whether a collision warning signal is generated, a steering angle of front wheels included in the host vehicle, or a steering angular velocity of the front wheels, or any combination thereof. For example, the processor 103 of the vehicle control device 101 may determine whether the host vehicle is in situation where the host vehicle is avoiding a collision, based on the collision warning signal being generated through the forward collision avoidance system, and a value, identified based on at least one of the steering angle of the front wheel, or the steering angular velocity of the front wheels, or any combination thereof, being out of a specified range. For example, the value identified based on at least one of the steering angle of the front wheel, or the steering angular velocity of the front wheels, or any combination thereof may be identified based on the product of the steering angle of the front wheel and the steering angular velocity of the front wheels. As another example, the value may be identified based on the sum of the product of the steering angle of the front wheel and a first constant and the product of the steering angular velocity of the front wheels and a second constant.

According to an embodiment, the processor 103 of the vehicle control device 101 may identify a first control amount for controlling the yaw angle of the host vehicle according to the speed of the host vehicle. The yaw angle may represent the degree of the rotation of the host vehicle on the ground surface relative to a reference angle centered on the z-axis perpendicular to the ground surface.

According to an embodiment, in situation where the steering wheel is adjusted to avoid a collision, the processor 103 of the vehicle control device 101 may operate the drive motor 105 for controlling the front wheels and the drive motor 105 for controlling the rear wheels according to the first control amount to quickly change the yaw angle and increase an avoidance distance. In a collision avoidance situation, the processor 103 of the vehicle control device 101 may control the front wheels and the rear wheels such that the host vehicle receives braking force in a direction opposite to the driving direction of the host vehicle according to the first control amount.

The first control amount may be identified such that the yaw angle is proportional to the yaw angular acceleration, which is a time-varying acceleration. The yaw angular acceleration may be identified according to Equation 1. In Equation 1 below, $\ddot{\theta}$ may denote a yaw angular acceleration. $v_x$ may denote a speed of the host vehicle. "L" may denote a distance between the axle of the front wheel and the axle of the rear wheel. "G" may denote a steering gear ratio. $k_3$ may denote a constant.

$$\ddot{\theta} = \frac{d}{dt}\left(\left(\frac{\delta_f \cdot v_x}{L + k_3 \cdot v_x^2}\right)\frac{1}{G}\right) \qquad \text{Equation 1}$$

According to an embodiment, the processor 103 of the vehicle control device 101 may determine whether the host vehicle is in situation where the operation of the host vehicle is stabilized, after the situation where the host vehicle is avoiding a collision, based on whether the collision warning signal is generated after the situation where the host vehicle is avoiding a collision, and at least one of a steering angle of the front wheel, a steering angular velocity of the front wheels, or a slip angle of the rear wheel, or any combination thereof. For example, the processor 103 of the vehicle control device 101 may determine whether the host vehicle is in the situation where the host vehicle is avoiding a collision based on the generation of the collision warning signal is stopped by the forward collision avoidance system, the value, identified based on at least one of the steering angle of the front wheel, or the steering angular velocity of the front wheels, or any combination thereof, being out of the specified range, and the slip angle of the rear wheel exceeding a threshold angle.

According to an embodiment, the processor 103 of the vehicle control device 101 may operate the drive motor 105 that controls the front wheels and the drive motor 105 that controls the rear wheels based on the first control amount and the second control amount to slowly change the yaw angle, reduce the slip angle of the rear wheel and the roll angle of the host vehicle, in the situation where the operation of the host vehicle is stabilized after the situation where the host vehicle is avoiding a collision. For example, the processor 103 of the vehicle control device 101 may operate the drive motor 105 that controls the front wheels based on a value obtained by adding the absolute value of the first control amount and the absolute value of the second control amount. For example, the processor 103 of the vehicle control device 101 may operate the drive motor 105 that controls the rear wheels based on a value obtained by subtracting the absolute value of the second control amount from the absolute value of the first control amount.

The roll angle may represent the degree of the rotation of the host vehicle compared to a reference angle around an axis that is perpendicular to the z-axis and indicates the driving direction of the host vehicle.

According to an embodiment, if the processor 103 of the vehicle control device 101 is in the situation where the operation of the host vehicle is stabilized after the situation where the host vehicle is avoiding a collision, the first control amount may indicate a rotational direction opposite to the rotational direction of the drive motor in a collision avoidance situation.

The first control amount may be identified such that the yaw angle is proportional to the yaw angular acceleration, which is a time-varying acceleration.

According to an embodiment, the processor 103 of the vehicle control device 101 may identify a second control amount for controlling the roll angle of the host vehicle based on at least one of a lateral acceleration of the host vehicle, a coefficient of friction between the ground and the front wheel, a coefficient of friction between the ground and the rear wheel, a speed of the host vehicle, or a steering angle of the front wheel, or any combination thereof, in the situation where the operation of the host vehicle is stabilized after the situation where the host vehicle is avoiding a collision.

According to an embodiment, the processor 103 of the vehicle control device 101 may identify the second control amount based on a value obtained by adding a feedforward control amount, which is the control amount of the drive motor 105 for feedforward control, and a feedback control amount, which is the control amount of the drive motor 105 for feedback control.

For example, the feedforward control amount may be identified based on at least one of lateral acceleration of the host vehicle, centripetal force received by the front wheels, or centripetal force received by the rear wheels, or any combination thereof. As an example, the feedforward control amount may be identified such that the feedforward control amount is proportional to an estimated roll angle, which is proportional to the lateral acceleration of the host vehicle and inversely proportional to the sum of the centripetal force received by the front wheels and the centripetal force received by the rear wheels. The centripetal force received by the front wheels may be inversely proportional to the coefficient of friction between the ground and the front wheels, and may be proportional to the absolute value of the lateral acceleration of the host vehicle. The centripetal force received by the rear wheels may be inversely proportional to the coefficient of friction between the ground and the rear wheels, and may be proportional to the absolute value of the lateral acceleration of the host vehicle.

For example, the feedback control amount may be identified based on at least one of a target roll angle that is a target for controlling the roll angle of the host vehicle, or an estimated roll angle that is estimated to be the roll angle of the host vehicle, or any combination thereof. As an example, the feedback control amount may be identified such that the control amount of the drive motor for feedback control is proportional to a difference between the target roll angle and the estimated roll angle, and a difference between the target roll angular acceleration, which is the amount of change in the target roll angle over time, and the estimated roll angular acceleration, which is the amount of change in the estimated roll angle over time.

According to an embodiment, the second control amount may be identified according to Equation 2. In Equation 2 below, $A_y$ may denote a lateral acceleration of the host vehicle. M may denote the mass of the host vehicle. "h" may denote the height of the center of gravity. $C_f$ may denote the centripetal force received by the front wheels. $C_r$ may denote the centripetal force received by the rear wheels. $\phi_{target}$ may denote the target roll angle. $\phi_{estimated}$ may denote the estimated roll angle. $\dot{\phi}_{target}$ may denote the amount of change in the target roll angle over time. $\dot{\phi}_{estimated}$ may denote the amount of change in the estimated roll angle over time. $k_3$, $k_{10}$, $k_{11}$, and $k_{12}$ may denote constants. The first term for calculating the second control amount in Equation 2 may represent the feedforward control amount. The terms after the first term in Equation 2 may represent the feedback control amount.

$$\text{Second control amount} = \left( k_{10} \cdot \frac{A_y \cdot M \cdot h}{C_f + C_r} \cdot k_3 \right) + \qquad \text{Equation 2}$$
$$\left( \left( k_{11} \cdot (\phi_{target} - \phi_{estimated}) + k_{12} \cdot (\dot{\phi}_{target} - \dot{\phi}_{estimated}) \right) \right)$$

According to one embodiment, the processor 103 of the vehicle control device 101 may adjust the front wheel control amount or the rear wheel control amount such that a difference between the front-wheel control amount and the rear-wheel control amount is maintained, and the front-wheel control amount and rear-wheel control amount fall within a specified control amount range based on the front wheel control amount or the rear wheel control amount being out of the specified control amount range. This is because the controllable amount of the drive motor that controls the front wheels or the drive motor that controls the rear wheels is limited.

For example, the processor 103 of the vehicle control device 101 may specify the specified control amount range to be less than or equal to the specified control amount value, and if the front wheel control amount exceeds the specified control amount value, adjust the front wheel control amount exceeding the specified control amount value to be less than or equal to the specified control amount value, and adjust the rear wheel control amount by adding the rear wheel control amount and a value obtained by subtracting the front wheel control amount after adjustment from the front wheel control amount before adjustment.

For example, if a first control amount is about 200 N·m, a second control amount is about 300 N·m, and a specified range is less than or equal to a specified control amount value (about 200 N·m), the front wheel control amount may be about 250 N·m. The rear wheel control amount may be about −50 N·m. Because the front wheel control amount (about 250 N·m) is greater than the specified control amount value (about 200 N·m), the processor 103 of the vehicle control device 101 may adjust the front wheel control amount to about 200 N·m so as to be less than or equal to the specified control amount value. The processor 103 of the vehicle control device 101 may adjust the rear wheel control amount to about 0 N·m by adding the value (about 50 N·m) obtained by subtracting the front wheel control amount after adjustment (about 200 N·m) from the front wheel control amount before adjustment (about 250 N·m) to the rear wheel control amount (about −50 N·m).

According to an embodiment, the processor 103 of the vehicle control device 101 may rotate the rear wheels in the opposite direction to the rotation direction of the front wheels if the front wheel control amount or the rear wheel control amount falls within the specified control amount range and the absolute value of the second control amount is greater than the absolute value of the first control amount.

According to an embodiment, the processor 103 of the vehicle control device 101 may identify situation where the host vehicle is avoiding a collision and situation where the operation of the host vehicle is stabilized has ended based on a value, which is identified based on at least one of the steering angle of the front wheel, or the steering angular velocity of the front wheels, falling within a specified range; a yaw angular velocity which is the velocity at which the yaw angle changes, falling within the specified yaw angular velocity range continuously for a certain period of time; or generation of a collision waring signal being stopped.

If situation where the host vehicle is avoiding a collision and situation where the operation of the host vehicle is stabilized has ended, the processor 103 of the vehicle control device 101 may end the control of the drive motor 105 to avoid a collision or stabilize the operation of the host vehicle.

Figure 2:
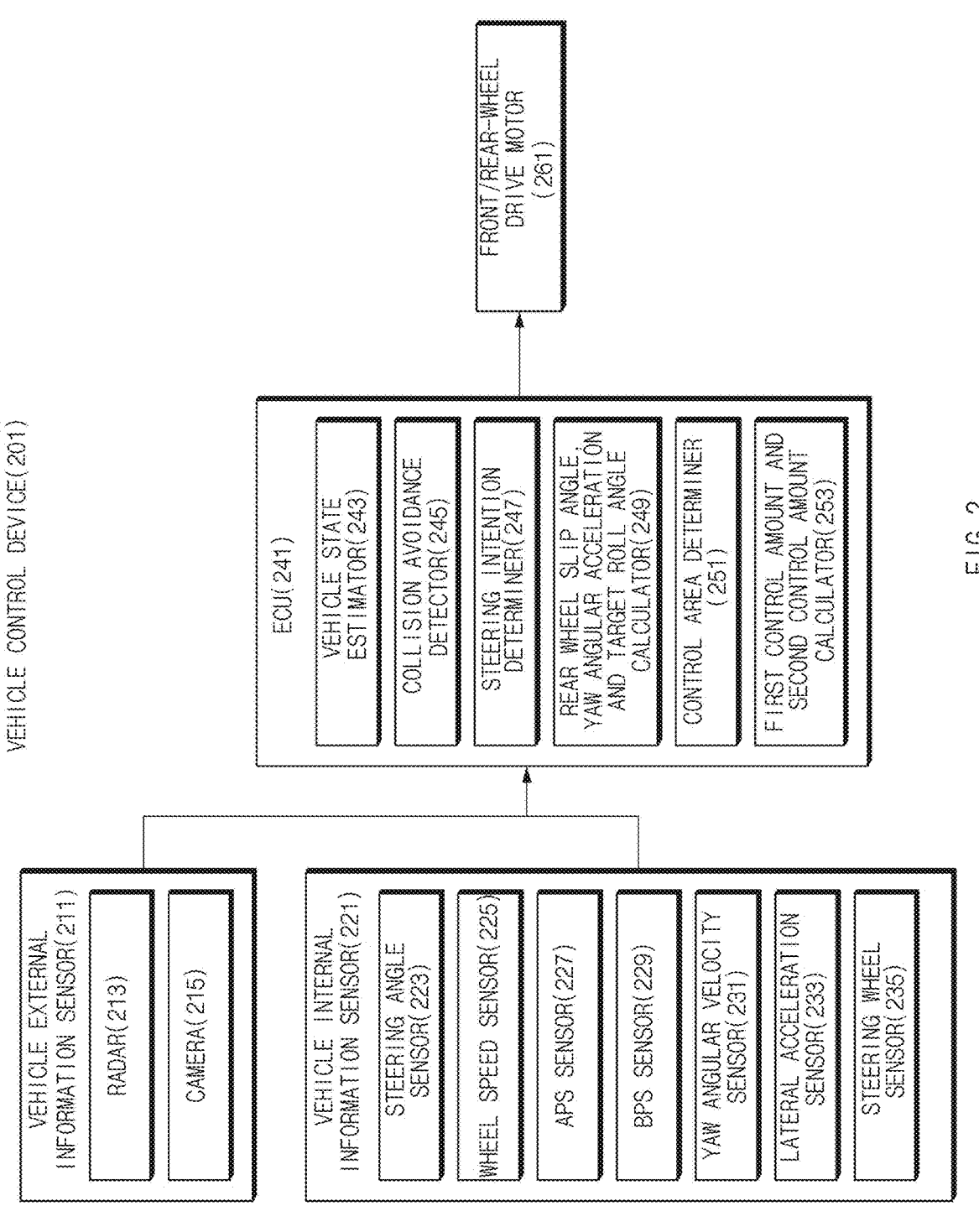
FIG. 2 is a block diagram specifically illustrating a vehicle control device according to an embodiment of the present disclosure.

FIG. 2 is a block diagram specifically illustrating a vehicle control device according to an embodiment of the present disclosure.

Referring to FIG. 2, a vehicle control device 201 according to an embodiment of the present disclosure may be implemented inside or outside a vehicle, and some of components included in the vehicle control device 201 may be implemented inside or outside the vehicle.

Referring to FIG. 2, the vehicle control device 201 may include a vehicle external information sensor 211, a vehicle internal information sensor 221, an electronic control unit (ECU) 241, and a front- or rear-wheel drive motor 261. At least one of the vehicle external information sensor 211, the vehicle internal information sensor 221, the electronic control unit (ECU) 241, or the front- or rear-wheel drive motor 261, or any combination thereof may be electronically and/or operably coupled with each other by an electronic component, such as a communication bus.

According to an embodiment, hereinafter, combining pieces of hardware operatively may mean a direct connection or an indirect connection between the pieces of hardware being established in a wired or wireless manner such that second hardware of the pieces of hardware is controlled by first hardware of the pieces of hardware. The type and/or number of hardware included in the vehicle control device 201 is not limited to that shown in FIG. 2. For example, the vehicle control device 201 may include only some of hardware components shown in FIG. 2.

According to an embodiment, the vehicle external information sensor 211 may include a radar 213 and a camera 215. The vehicle internal information sensor 221 may include a steering angle sensor 223, a wheel speed sensor 225, an acceleration position sensor (APS) 227, a brake position sensor (BPS) 229, a yaw angular velocity sensor 231, a lateral acceleration sensor 233, and a steering wheel sensor 235. The ECU 241 may include a vehicle state estimator 243, a collision avoidance detector 245, a steering intention determiner 247, a rear wheel slip angle, yaw angular acceleration and target roll angle calculator 249, a control area determiner 251, and a first control amount and second control amount calculator 253. The target roll angle may be referred to as a target roll angle.

According to an embodiment, the vehicle control device 201 may transmit information obtained from the vehicle external information sensor 211 and the vehicle internal information sensor 221 to the vehicle state estimator 243 within the ECU 241.

Based on the information received from the vehicle state estimator 243, the vehicle control device 201 may determine whether the host vehicle is in situation where the host vehicle is avoiding a collision or situation where the operation of the host vehicle is stabilized after collision avoidance based on information calculated by the rear wheel slip angle, yaw angular acceleration and target roll angle calculator 249 through the collision avoidance detector 245 and the steering intention determiner 247.

The vehicle control device 201 may transmit, to the control area determiner 251, and the first control amount and second control amount calculator 253, whether the host vehicle is in situation where the host vehicle is avoiding a collision or situation where the operation of the host vehicle is stabilized after collision avoidance.

The vehicle control device 201 may determine the front wheel control amount or the rear wheel control amount in the first control amount and second control amount calculator 253. The vehicle control device 201 may transmit the front wheel control amount or rear wheel control amount calculated by the first control amount and second control amount calculator 253 to the front- or rear-wheel drive motor 261.

The vehicle control device 201 may control the front wheels to rotate based on the front wheel control amount through the front- or rear-wheel drive motor 261. The vehicle control device 201 may control the rear wheels to rotate based on the rear wheel control amount through the front- or rear-wheel drive motor 261.

Figure 3:
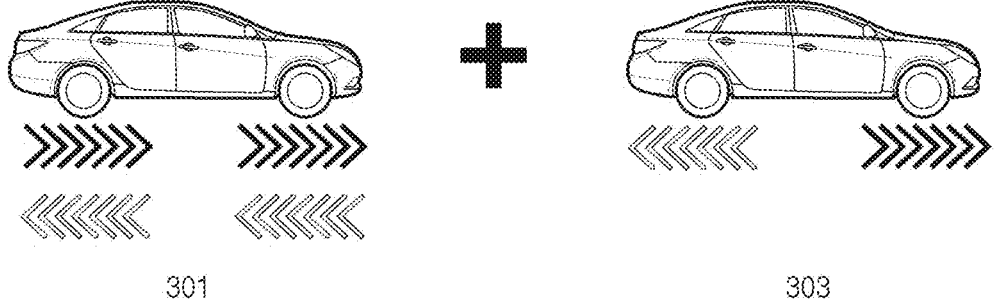
FIG. 3 illustrates operations of front wheels and rear wheels which are independently controlled in a vehicle control device or a vehicle control method according to an embodiment of the present disclosure.

FIG. 3 illustrates operations of front wheels and rear wheels which are independently controlled in a vehicle control device or a vehicle control method according to an embodiment of the present disclosure.

Referring to FIG. 3, in a first operation 301, a vehicle control device may operate a drive motor that controls front wheels and a drive motor that controls rear wheels such that a direction in which the front wheels rotate is identical to a direction in which the rear wheels rotate to control a yaw angle of a host vehicle.

In a second operation 303, the vehicle control device may operate a drive motor that controls front wheels and a drive motor that controls rear wheels such that the direction in which the front wheels rotate is different from the direction in which the rear wheels rotate to control a roll angle of the host vehicle.

In the first operation 301, the processor of the vehicle control device according to an embodiment may control the front wheels and the rear wheels such that the direction in which the front wheels rotate is identical to the direction in which the rear wheels rotate to control the yaw angle of the host vehicle.

According to an embodiment, in situation where the steering wheel is adjusted to avoid a collision, the processor of the vehicle control device may operate the drive motor for controlling the front wheels and the drive motor for controlling the rear wheels according to the first control amount to quickly change the yaw angle and increase an avoidance distance. In situation where the host vehicle is avoiding a collision, the processor of the vehicle control device may control the front wheels and rear wheels such that the host vehicle receives braking force in a direction opposite to the driving direction of the host vehicle according to the first control amount.

In the second operation 303, the processor of the vehicle control device according to an embodiment may control the front wheels and the rear wheels such that the direction in which the front wheels rotate is different from the direction in which the rear wheels rotate to reduce the roll angle of the host vehicle.

In other words, if an estimated roll angle estimated as the roll angle of the host vehicle is different from the target roll angle, the vehicle control device may control the front wheels and rear wheels such that the direction in which the front wheels rotate is different from the directions in which the rear wheels rotate to control the host vehicle such that the estimated roll angle approaches the target roll angle.

According to an embodiment, the target roll angle may be identified based on the speed of the host vehicle and the steering angle of the front wheel. The target roll angle may be identified according to Equation 3. In Equation 3 below, $\phi_{target}$ may denote a target roll angle. $v_x$ may denote the speed of the host vehicle. "L" may denote a distance between the axle of the front wheels and the axle of the rear wheels. $\delta_f$ may denote a steering angle of the front wheel. $k_5$ may denote a constant.

$$\phi_{target} = \frac{v_x}{k_4 \cdot v_x^2 + L} \cdot \delta_f \cdot v_x \cdot k_5 \qquad \text{Equation 3}$$

According to an embodiment, the estimated roll angle may be identified based on the lateral acceleration of the host vehicle, the centripetal force received by the front wheels, and the centripetal force received by the rear wheels. The estimated roll angle may be identified according to Equation 4. In Equation 4 below, $\phi_{estimated}$ may denote the estimated roll angle. $A_y$ may denote the lateral acceleration of the host vehicle. M may denote the mass of the host vehicle. "h" may denote the height of the center of gravity. $C_f$ may denote the centripetal force received by the front wheels. $C_r$ may denote the centripetal force received by the rear wheels. $k_3$ may denote a constant.

$$\phi_{estimated} = \frac{A_y \cdot M \cdot h}{C_f + C_r} \cdot k_3 \qquad \text{Equation 4}$$

According to an embodiment, the centripetal force received by the front wheels may be identified according to Equation 5. In Equation 5 below, $C_f$ may denote the centripetal force received by the front wheels. $A_y$ may denote the lateral acceleration of the host vehicle. $\mu$ may denote the coefficient of friction between the ground and the front or rear wheels. $k_6$ and $k_7$ may denote constants.

$$C_f = \frac{|A_y| \cdot k_6}{\mu} \cdot k_7 \qquad \text{Equation 5}$$

According to an embodiment, the centripetal force received by the rear wheels may be identified according to Equation 6. In Equation 6 below, $C_r$ may denote the centripetal force received by the rear wheels. $A_y$ may denote the lateral acceleration of the host vehicle. $\mu$ may denote the coefficient of friction between the ground and the front or rear wheels. $k_3$ and $k_9$ may denote constants.

$$C_r = \frac{|A_y| \cdot k_3}{\mu} \cdot k_9 \qquad \text{Equation 6}$$

According to an embodiment, the vehicle control device may simultaneously perform the first operation 301 and the second operation 303 to control the yaw angle and the roll angle of the host vehicle in a situation where the host vehicle is stabilizing it's operation after the situation where the host vehicle is avoiding a collision Accordingly, if the rotation direction of the front wheels according to the first operation 301 is identical to the rotation direction of the rear wheels according to the second operation 303, the processor of the vehicle control device may operate a drive motor that controls the front wheels according to a value obtained by adding the absolute value of the first control amount according to the first operation 301 and the absolute value of the second control amount according to the second operation 303.

In addition, if the rotation direction of the rear wheels according to the first operation 301 is different from the rotation direction of the rear wheels according to the second operation 303, the processor of the vehicle control device may operate a drive motor that controls the rear wheels according to a value obtained by subtracting the absolute value of the second control amount according to the second operation 303 from the absolute value of the first control amount according to the first operation 301.

Figure 4:
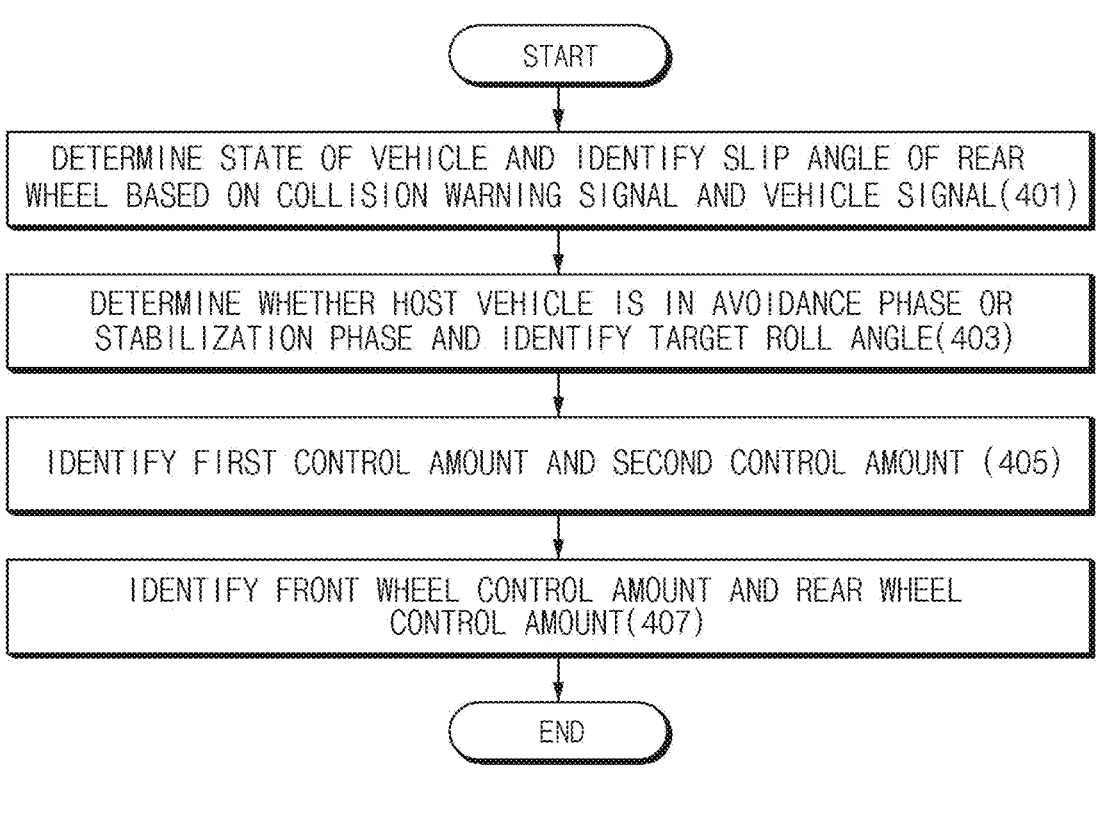
FIG. 4 illustrates a flow chart of operation of a vehicle control device for identifying a front wheel control amount and a rear wheel control amount in a vehicle control device or a vehicle control method according to an embodiment of the present disclosure.

FIG. 4 illustrates a flow chart of operation of a vehicle control device for identifying a front wheel control amount and a rear wheel control amount in a vehicle control device or a vehicle control method according to an embodiment of the present disclosure.

Hereinafter, it is assumed that the vehicle control device 101 of FIG. 1 performs the process of FIG. 4. Additionally, in the description of FIG. 4, operations described as being performed by the vehicle control device may be understood as being controlled by the processor 103 of the vehicle control device 101.

Referring to FIG. 4, in a first operation 401, the processor of a vehicle control device may determine a vehicle state and identify a slip angle of rear wheels based on a collision warning signal and a vehicle signal. The vehicle signal may represent information obtained from a vehicle internal information sensor. For example, the vehicle internal information may include at least one of a steering angle of front wheels, a steering angle of rear wheels, the amount of operation of a steering wheel, a lateral acceleration of the host vehicle, a yaw angular velocity, or a yaw angle, or any combination thereof.

In a second operation 403, the processor of the vehicle control device may identify whether the host vehicle is in an avoidance phase or a stabilization phase and identify a target roll angle. The avoidance phase may include controlling, by a driver, the host vehicle to avoid a collision with an object that is located in front of the host vehicle and is different from the host vehicle. The stabilization phase may include controlling, by a vehicle control device, the host vehicle to stabilize the operation of the host vehicle after the avoidance phase. The processor of the vehicle control device may identify a target roll angle and an estimated roll angle.

In a third operation 405, the processor of the vehicle control device may identify a first control amount and a second control amount.

According to an embodiment, the processor of the vehicle control device may identify the first control amount for controlling the yaw angle of the host vehicle according to the speed of the host vehicle.

According to an embodiment, the processor of the vehicle control device may identify a second control amount for controlling the roll angle of the host vehicle based on at least one of a lateral acceleration of the host vehicle, a coefficient of friction between the ground and the front wheel, a coefficient of friction between the ground and the rear wheel, a speed of the host vehicle, or a steering angle of the front wheel, or any combination thereof, in the situation where the operation of the host vehicle is stabilized after the situation where the host vehicle is avoiding a collision. The processor of the vehicle control device may identify the second control amount based on a value obtained by adding a feedforward control amount and a feedback control amount. The processor of the vehicle control device may consider the feedback control amount in identifying the second control amount based on the occurrence of an error roll angle that is a difference between the target roll angle and the estimated roll angle.

In a fourth operation 407, the processor of the vehicle control device may identify the front wheel control amount and the rear wheel control amount.

According to an embodiment, the processor of the vehicle control device may identify the front wheel control amount, which is the control amount of a drive motor that controls the front wheels, based on a value obtained by adding the absolute value of the first control amount and the absolute value of the second control amount. According to an embodiment, the processor of the vehicle control device may identify the rear wheel control amount which is the control amount of a drive motor that controls the rear wheels based on a value obtained by subtracting the absolute value of the second control amount from the absolute value of the first control amount.

Figure 5:
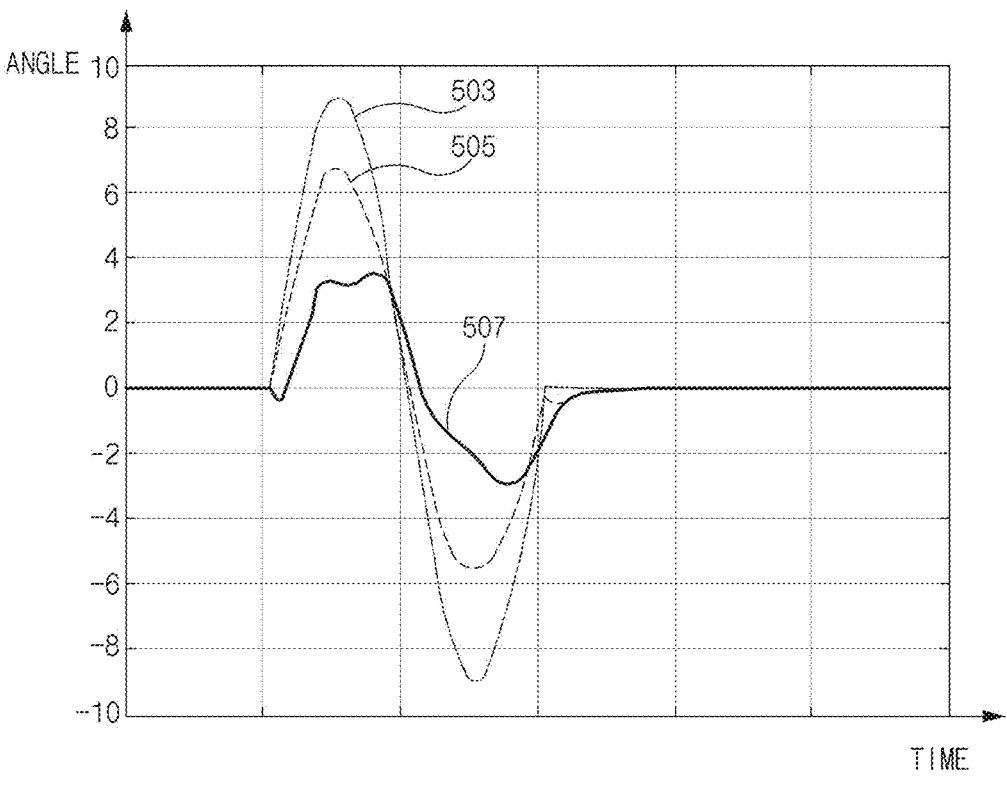
FIG. 5 is a graph showing the slip angle of front wheels and the slip angle of rear wheels according to a steering angle while operation of avoiding collision and stabilizing operation of a host vehicle is performed in a vehicle control device or a vehicle control method according to an embodiment of the present disclosure.

FIG. 5 is a graph showing the slip angle of front wheels and the slip angle of rear wheels according to a steering angle while operation of avoiding collision and stabilizing operation of a host vehicle is performed in a vehicle control device or a vehicle control method according to an embodiment of the present disclosure.

Referring to FIG. 5, a graph 501 may show a steering angle, a slip angle of front wheels, and a slip angle of rear wheels in situation of avoiding a collision and situation of stabilizing the operation of the host vehicle. A first line 503 may represent a value obtained by multiplying the steering angle by 0.1, which is a steering gear angle. A second line 505 may represent the slip angle of the front wheel. A third line 507 may represent the slip angle of the rear wheel.

According to an embodiment, the processor of the vehicle control device may determine whether the host vehicle is in situation where the operation of the host vehicle is stabilized, after the situation where the host vehicle is avoiding a collision, based on whether the collision warning signal is generated, and at least one of a steering angle of the front wheel, a steering angular velocity of the front wheels, or a slip angle of the rear wheel, or any combination thereof.

In particular, the processor of the vehicle control device may identify whether the host vehicle is in the situation where the operation of the host vehicle is stabilized based on the slip angle of the rear wheel exceeding a threshold angle.

In situation where the host vehicle is avoiding a collision, a driver may increase the amount of operation of a steering wheel to be not smaller than a reference value, and in situation where the operation of the host vehicle is stabilized after collision avoidance, the driver may reduce the amount of operation of the steering wheel to be smaller than the reference value. Accordingly, the slip angle of the rear wheel may increase in the situation where the host vehicle is avoiding a collision, and the slip angle of the rear wheel may decrease in the situation where the operation of the host vehicle is stabilized after collision avoidance.

The slip angle of the front wheel may be identified according to Equation 7. In Equation 7, $\alpha_f$ may denote the slip angle of the front wheel. $\delta_f$ may denote the steering angle of the front wheel. $\beta$ may denote the slip angle of a vehicle body. $l_f$ may denote a distance from the center of gravity to the rear wheels. $v_x$ may denote the speed of the host vehicle. $\gamma$ may denote the yaw angular velocity.

$$\alpha_f = \delta_f - \left( \beta + \frac{l_f}{v_x} \cdot \gamma \right)$$

Equation 7

The slip angle of the rear wheel may be identified according to Equation 8. In Equation 8, $\alpha_r$ may denote the slip angle of the rear wheel. $\delta_r$ may denote the steering angle of the rear wheel. $\beta$ may denote the slip angle of a vehicle body. $l_r$ may denote a distance from the center of gravity to the front wheel. $v_x$ may denote the speed of the host vehicle. $\gamma$ may denote the yaw angular velocity.

$$\alpha_r = \delta_r + \frac{l_r}{v_x} \cdot \gamma - \beta$$

Equation 8

The slip angle of the vehicle body may be identified according to Equation 9. In Equation 9, $A_y$ may denote a lateral acceleration of the host vehicle. $v_x$ may denote the speed of the host vehicle. $\gamma$ may denote the yaw angular velocity.

$$\beta \cong \int \left( \frac{A_y}{v_x} - \gamma \right) dt$$

Equation 9

Figure 6:
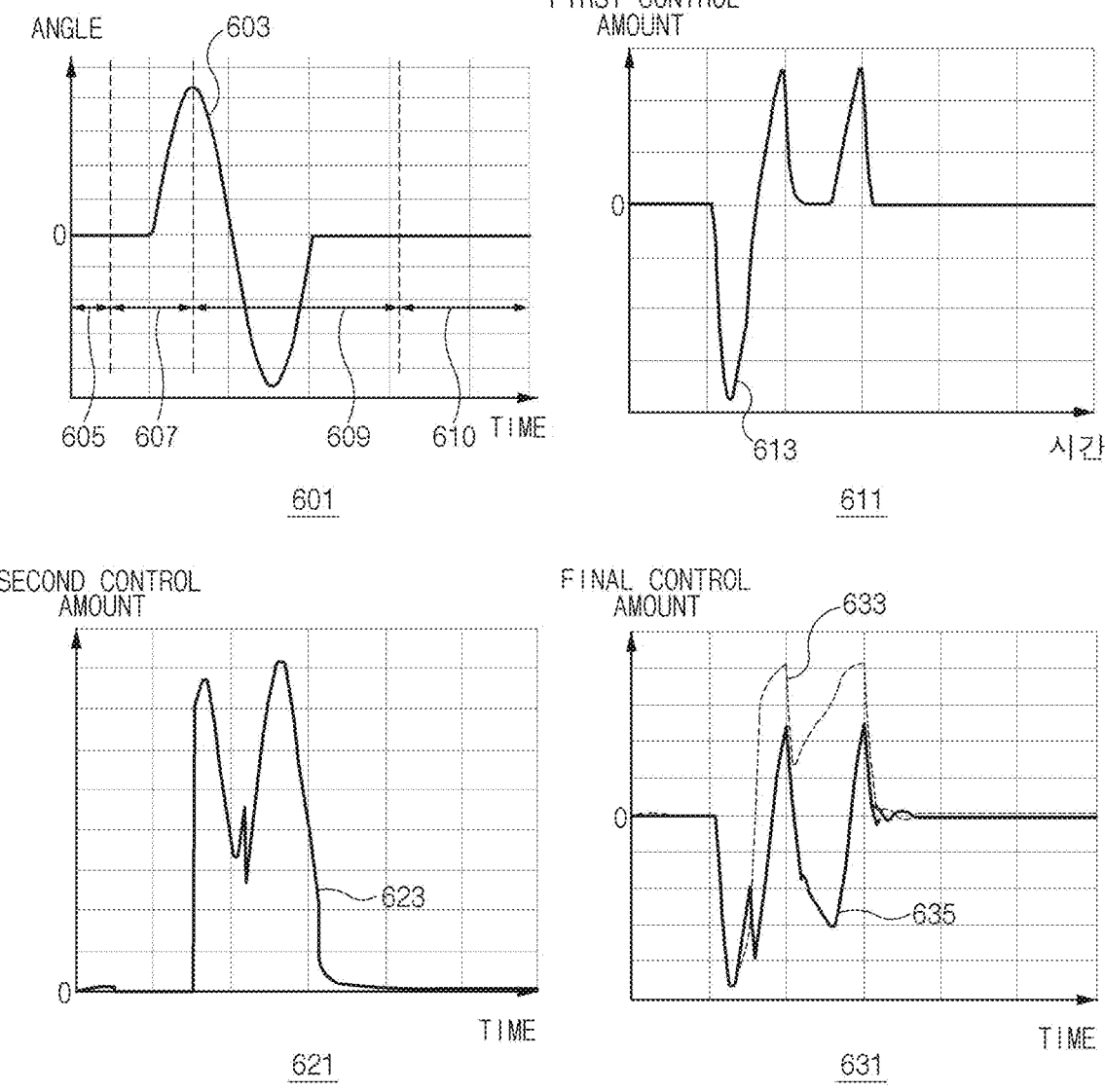
FIG. 6 are graphs showing a steering angle, a first control amount, a second control amount, and a final control amount while operation of avoiding collision and stabilizing operation of a host vehicle is performed in a vehicle control device or a vehicle control method according to an embodiment of the present disclosure.

FIG. 6 are graphs showing a steering angle, a first control amount, a second control amount, and a final control amount while operation of avoiding collision and stabilizing operation of a host vehicle is performed in a vehicle control device or a vehicle control method according to an embodiment of the present disclosure.

Referring to FIG. 6, a first graph 601 may represent a steering angle over time in situation of avoiding a collision and situation of stabilizing the operation of the host vehicle. A first line 603 may represent a steering angle. The first graph 601 may represent a first phase 605, a second phase 607, a third phase 609, and a fourth phase 610 over time. The first phase 605 may represent situation before collision avoidance. The second phase 607 may represent situation where the host vehicle is avoiding a collision. The third phase 609 may represent situation where the operation of the host vehicle is stabilized after the situation where the host vehicle is avoiding a collision. The fourth phase 610 may represent situation where the operation of the host vehicle has been stabilized after the situation where the operation of the host vehicle is stabilized.

A second graph 611 may represent the first control amount over time in the situation where the host vehicle is avoiding a collision and the situation where the operation of the host vehicle is stabilized. A second line 613 may represent the first control amount.

The third graph 621 may represent the second control amount over time in the situation where the host vehicle is avoiding a collision and the situation where the operation of the host vehicle is stabilized. A third line 623 may represent the second control amount.

The fourth graph 631 may represent the final control amount over time in the situation where the host vehicle is avoiding a collision and the situation where the operation of the host vehicle is stabilized A fourth line 633 may represent the front wheel control amount. A fifth line 635 may represent the rear wheel control amount.

In the first phase 605 of the first graph 601, the vehicle control device according to an embodiment may not generate a control signal indicating the situation where the host vehicle is avoiding a collision. In the second phase 607 of the first graph 601, the vehicle control device according to the embodiment may generate a control signal indicating the situation where the host vehicle is avoiding a collision. In the third phase 609 of the first graph 601, the vehicle control device according to the embodiment may not generate a control signal indicating the situation where the host vehicle is avoiding a collision because the host vehicle is in the situation where the operation of the host vehicle is stabilized. In the fourth phase 610 of the first graph 601, the vehicle control device according to the embodiment may not generate the control signal indicating the situation where the host vehicle is avoiding a collision. A driver may adjust the steering angle as shown in the first line 603 according to the situation of the vehicle.

In the second graph 611, a first control amount for controlling the yaw angle of the host vehicle identified according to the speed of the host vehicle may be identified.

Referring to the second graph 611, in situation before avoiding a collision corresponding to the first phase 605 of the first graph 601, the absolute value of the first control amount (e.g., about 0) may be smaller than a reference absolute value.

Referring to the second graph 611, in the situation where the host vehicle is avoiding a collision, which corresponds to the second phase 607 of the first graph 601, the sign of the first control amount may indicate the rotation direction of the drive motor that generates a braking force that prevents the host vehicle from moving.

Referring to the second graph 611, in the situation where the operation of the host vehicle is stabilized after the situation where the host vehicle is avoiding a collision, which corresponds to the third phase 609 of the first graph 601, the sign of the first control amount may indicate a rotation direction opposite to the rotation direction of the drive motor in the situation where the host vehicle is avoiding a collision.

Referring to the second graph 611, in the situation where the operation of the host vehicle has been stabilized after the situation where the operation of the host vehicle is stabilized, which corresponds to the fourth phase 610 of the first graph 601, the absolute value of the first control amount (e.g., about 0) may be smaller than the reference absolute value.

Referring to the third graph 621, a second control amount for controlling the roll angle of the host vehicle may be identified based on at least one of a lateral acceleration of the host vehicle, a coefficient of friction between the ground and a front wheel, a coefficient of friction between the ground and a rear wheel, a speed of the host vehicle, or a steering angle of the front wheel, or any combination thereof. The rotation direction of the drive motor that controls front wheels according to the second control amount may be different from the rotation direction of the drive motor that controls rear wheels according to the second control amount. The rotation direction of the front wheels according to the second control amount may be different from the rotation direction of the rear wheels according to the second control amount.

In the fourth graph 631, a final control amount based on a value obtained by adding the first control amount and the second control amount may be identified. The fourth line 633 may indicate a front wheel control amount, which is a control amount of the drive motor that controls the front wheels. The fifth line 635 may indicate a rear wheel control amount, which is the control amount of the drive motor that controls the rear wheels.

In the situation where the operation of the host vehicle is stabilized, the rotation direction of the drive motor that controls the front wheels according to a first control amount may be identical to the rotation direction of the drive motor that controls the front wheels according to the second control amount. In the situation where the operation of the host vehicle is stabilized, the rotation direction of the drive motor that controls the rear wheels according to a first control amount may be different from the rotation direction of the drive motor that controls the rear wheels according to the second control amount.

Therefore, the front wheel control amount identified based on a value obtained by adding the absolute value of the first control amount and the absolute value of the second control amount may be identified as in the fourth line 633. The rear wheel control amount identified based on a value obtained by subtracting the absolute value of the second control amount from the absolute value of the first control amount may be identified as in the fifth line 635.

FIG. 7 illustrates a flow chart of operation of a vehicle control device for performing operation of avoiding a collision and stabilizing the operation of a host vehicle, in a vehicle control device or a vehicle control method according to one embodiment of the present disclosure.

Hereinafter, it is assumed that the vehicle control device 101 of FIG. 1 performs the process of FIG. 7. Additionally, in the description of FIG. 7, operations described as being performed by the vehicle control device may be understood as being controlled by the processor 103 of the vehicle control device 101.

Referring to FIG. 7, in a first operation 701, the processor of a vehicle control device may obtain information via sensors. The sensors may include a vehicle external sensor and a vehicle internal sensor.

In a second operation 703, the processor of the vehicle control device may identify whether a collision situation exists. If a collision situation exists, the processor of the vehicle control device may perform a third operation 705. If a collision situation does not exist, the processor of the vehicle control device may perform the first operation 701.

According to an embodiment, the processor of the vehicle control device may detect an object located in front of a host vehicle, which is different from the host vehicle based on at least one of a LIDAR, or a camera, or a combination thereof, and generate a collision waring signal based on detecting the object.

In the third operation 705, the processor of the vehicle control device may identify whether a driver is operating a steering wheel. If the driver is not operating the steering wheel, the processor of the vehicle control device may perform a fourth operation 707. If the driver is operating the steering wheel, the processor of the vehicle control device may perform the fifth operation 709.

According to an embodiment, the processor of the vehicle control device may identify whether the driver is operating the steering wheel based on a steering angle of the front wheel, and a steering angular velocity of the front wheel.

In the fourth operation 707, the processor of the vehicle control device may perform brake control. According to an embodiment, the processor of the vehicle control device may perform braking control through the brake.

In the fifth operation 709, the processor of the vehicle control device may estimate the slip angle of the rear wheel and calculate an error roll angle. The error roll angle may be identified based on a difference between a target roll angle and the estimated roll angle.

In the sixth operation 711, the processor of the vehicle control device may identify whether the slip angle is greater than a threshold angle. If the slip angle is not greater than the threshold angle, the processor of the vehicle control device may perform a seventh operation 713. If the slip angle is greater than the threshold angle, the processor of the vehicle control device may perform an eighth operation 715.

In the seventh operation 713, the processor of the vehicle control device may perform avoidance control. The processor of the vehicle control device may operate a drive motor that controls front wheels and a drive motor that controls rear wheels based on the first control amount.

In other words, the processor of the vehicle control device may identify the first control amount as the front wheel control amount or the rear wheel control amount, based on a value identified based on at least one of the steering angle of the front wheel, or the steering angular velocity of the front wheels, or any combination thereof being out of a specified range after the situation where the host vehicle is avoiding a collision, the generation of a collision warning signal being not stopped, or the slip angle of the rear wheel being smaller than or equal to a threshold angle.

In the eighth operation 715, the processor of the vehicle control device may perform stability control. The stability control of the eighth operation 715 may include feedforward control. According to an embodiment, in feedforward control, the processor of the vehicle control device may identify a feedforward control amount as the second control amount.

In a ninth operation 717, the processor of the vehicle control device may identify whether an error roll angle occurs. If an error roll angle occurs, the processor of the vehicle control device may perform a tenth operation 719. If an error roll angle does not occur, the processor of the vehicle control device may perform the eighth operation 715.

In the tenth operation 719, the processor of the vehicle control device may perform stability control. The stability control in the tenth operation 719 may include feedforward control and feedback control. According to an embodiment, the processor of the vehicle control device may identify the second control amount based on a feedforward control amount and a feedback control amount.

In other words, the processor of the vehicle control device may identify a front wheel control mount according to a value obtained by adding the absolute value of the first control amount and the absolute value of the second control amount, and identify the rear wheel control amount according to a value obtained by subtracting the absolute value of the second control amount from the absolute value of the first control amount, based on a value identified based on at least one of the steering angle of the front wheel, or the steering angular velocity of the front wheels, or any combination thereof being out of a specified range after the situation where the host vehicle is avoiding a collision, the generation of a collision warning signal being stopped, or the slip angle of the rear wheel being greater than or equal to a threshold angle.

In an eleventh operation 721, the processor of the vehicle control device may identify whether the front wheel control amount is greater than a specified value. If the front wheel control amount is not greater than the specified value, the processor of the vehicle control device may perform a twelfth operation 723. If the front wheel control amount is greater than the specified value, the processor of the vehicle control device may perform a thirteenth operation 725.

In the twelfth operation 723, the processor of the vehicle control device may perform existing control.

In the thirteenth operation 725, the processor of the vehicle control device may adjust the front wheel control amount and the rear wheel control amount.

According to an embodiment, the processor of the vehicle control device may adjust the front wheel control amount or the rear wheel control amount such that a difference between the front-wheel control amount and the rear-wheel control amount is maintained, and the front-wheel control amount and rear-wheel control amount fall within a specified control amount range based on the front wheel control amount or the rear wheel control amount being out of the specified control amount range.

For example, the processor of the vehicle control device may specify the specified control amount range to be less than or equal to a specified control amount value, and if the front wheel control amount exceeds the specified control amount value, adjust the front wheel control amount exceeding the specified control amount value to be less than or equal to the specified control amount value, and adjust the rear wheel control amount by adding the rear wheel control amount and a value obtained by subtracting the front wheel control amount after adjustment from the front wheel control amount before adjustment.

In a fourteenth operation 727, the processor of the vehicle control device may identify whether an end time is satisfied. If the end time is satisfied, the processor of the vehicle control device may end operation. If the end time is not satisfied, the processor of the vehicle control device may perform the sixth operation 711.

FIG. 8 illustrates a flow chart of operation of a vehicle control device for adjusting a control amount of the drive motor 105, in a vehicle control device, or a vehicle control method, according to one embodiment of the present disclosure.

Hereinafter, it is assumed that the vehicle control device 101 of FIG. 1 performs the process of FIG. 8. Also, in the description with reference to FIG. 8, it may be understood that the operations described as being performed by the vehicle control device are controlled by the processor 103 of the vehicle control device 101.

Referring to FIG. 8, in a first operation 801, the processor of a vehicle control device may identify whether a host vehicle is in situation where the host vehicle is avoiding a collision based on at least one of the occurrence of a collision warning signal, a steering angle of front wheels, or a steering angular velocity of the front wheels, or any combination thereof.

In a second operation 803, the processor of the vehicle control device may identify a first control amount for controlling a yaw angle of the host vehicle. According to an embodiment, the processor of the vehicle control device may identify a first control amount for controlling a yaw angle of the host vehicle based on the speed of the host vehicle.

In a third operation 805, the processor of the vehicle control device may identify a second control amount for controlling a roll angle of the host vehicle based on at least one of whether the generation of a collision warning signal is stopped, a steering angle of front wheels, a steering angular velocity of the front wheels, or a slip angle of rear wheels, or any combination thereof. According to an embodiment, the processor of the vehicle control device may identify the second control amount based on at least one of a lateral acceleration of the host vehicle, a coefficient of friction between the ground and the front wheels, a coefficient of friction between the ground and the rear wheels, a speed of the host vehicle, or a steering angle of the front wheel, or any combination thereof.

In a fourth operation 807, the processor of the vehicle control device may identify that the front wheel control amount or the rear wheel control amount is out of a specified control amount range.

The front wheel control amount, which is the control amount of a drive motor that controls the front wheels, may be identified based on a value obtained by adding the absolute value of the first control amount and the absolute value of the second control amount. The rear wheel control amount, which is the control amount of a drive motor that controls the rear wheels, may be identified based on a value by subtracting the absolute value of the second control amount from the absolute value of the first control amount.

In a fifth operation 809, the processor of the vehicle control device may adjust the front wheel control amount, or the rear wheel control amount. According to an embodiment, the processor of the vehicle control device may adjust the front wheel control amount, or the rear wheel control amount, based on the front wheel control amount or the rear wheel control amount being out of a specified control amount range. The processor of the vehicle control device may adjust the front wheel control amount, or the rear wheel control amount, such that a difference between the front wheel control amount and the rear wheel control amount is maintained, and the front wheel control amount and the rear wheel control amount falls within the specified control amount range.

Figure 9:
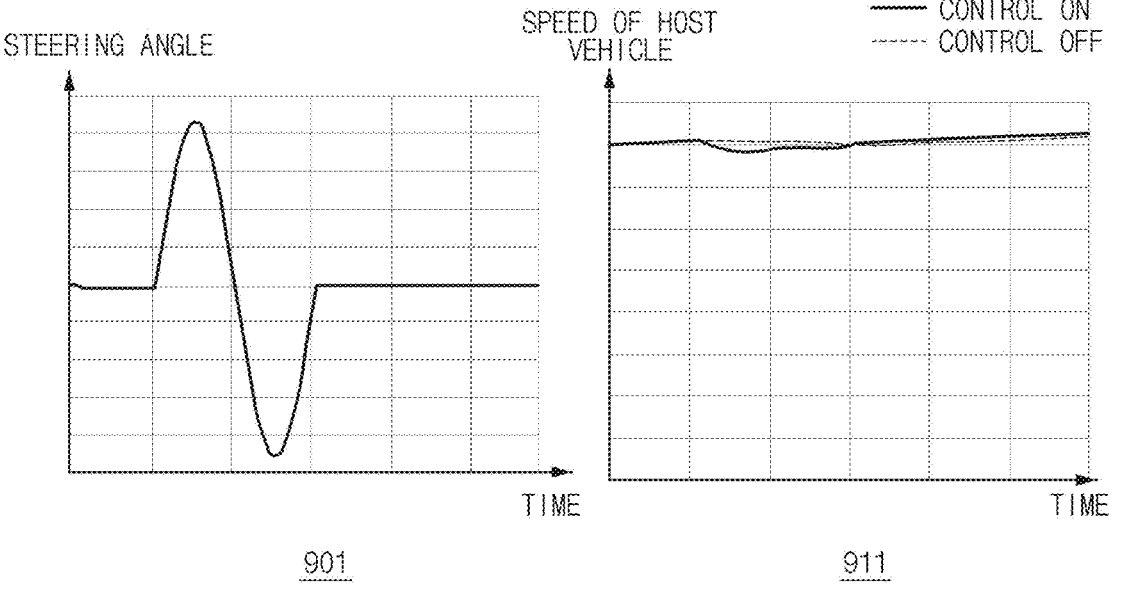
FIG. 9 illustrates a graph showing a steering angle and a speed of a host vehicle, during an operation of avoiding a collision and stabilizing operation of the host vehicle, in a vehicle control device or a vehicle control method according to one embodiment of the present disclosure.

FIG. 9 illustrates a graph showing a steering angle and a speed of a host vehicle, during an operation of avoiding a collision and stabilizing operation of the host vehicle, in a vehicle control device or a vehicle control method according to one embodiment of the present disclosure.

Referring to FIG. 9, a first graph 901 may show a steering angle over time in situation where a host vehicle is avoiding a collision and in situation where the operation of the host vehicle is stabilized. A second graph 911 may show the speed of the host vehicle over time in situation where a host vehicle is avoiding a collision and in situation where the operation of the host vehicle is stabilized.

According to an embodiment, the vehicle control device in a state where the controls for avoiding a collision and stabilizing the operation of the host vehicle are disabled may represent a conventional vehicle control device. The vehicle control device in a state where the controls for avoiding a collision and stabilizing the operation of the host vehicle are enabled may represent a vehicle control device according to an embodiment.

In the second graph 911, in situation where the host vehicle is avoiding a collision and in situation where the host vehicle is stabilizing the operation of the host vehicle, the speed of the host vehicle controlled according to the vehicle control device according to an embodiment may be smaller than the speed of the host vehicle controlled according to the conventional vehicle control device.

Figure 10:
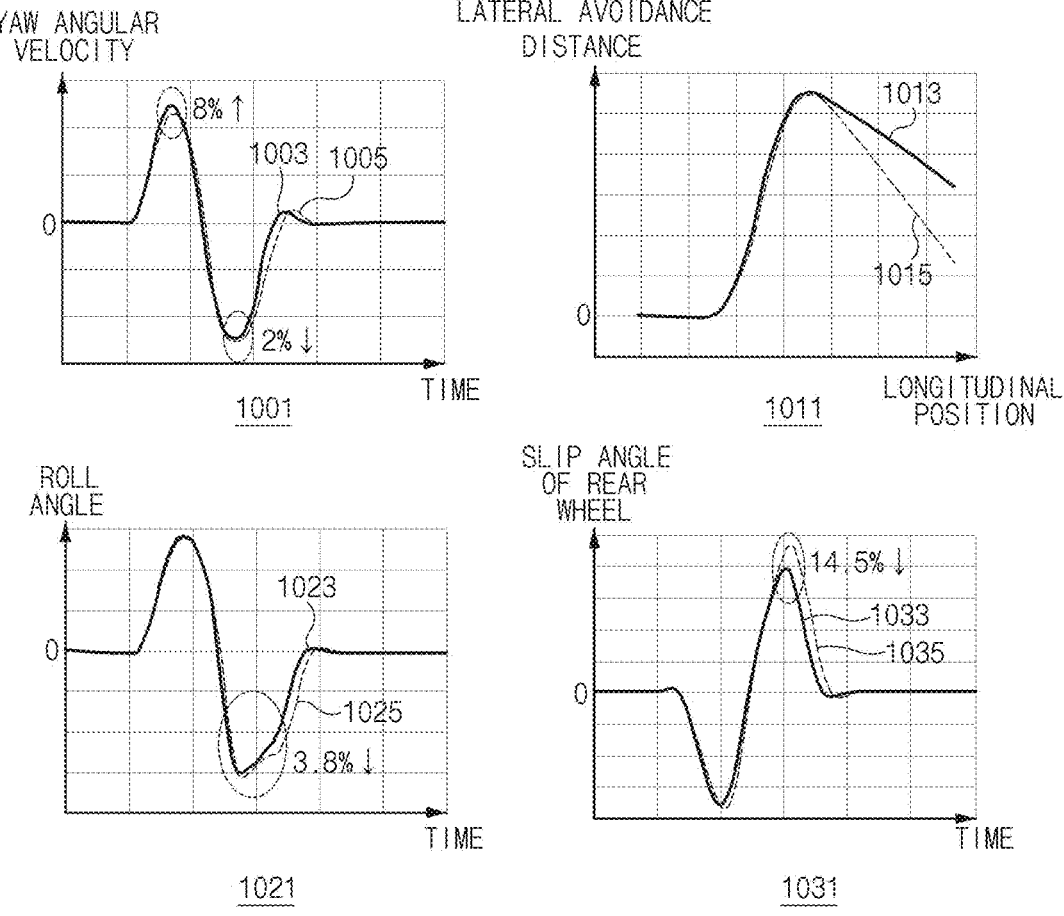
FIG. 10 illustrates graphs showing a yaw angular velocity, an avoidance distance, a roll angle, and a slip angle while an operation for avoiding a collision and stabilizing the operation of a host vehicle is performed in a vehicle control device or a vehicle control method according to an embodiment of the present disclosure.

FIG. 10 illustrates graphs showing a yaw angular velocity, an avoidance distance, a roll angle, and a slip angle while an operation for avoiding a collision and stabilizing the operation of a host vehicle is performed in a vehicle control device or a vehicle control method according to an embodiment of the present disclosure.

Referring to FIG. 10, a first graph 1001 may show a yaw angular velocity over time in situation of avoiding a collision and in situation of stabilizing the operation of the host vehicle. A first line 1003 may depict a yaw angular velocity as identified by a vehicle control device according to an embodiment. A second line 1005 may depict a yaw angular velocity as identified by a conventional vehicle control device.

A second graph 1011 may show an avoidance distance in the lateral direction according to a longitudinal position of the host vehicle in situation of avoiding a collision and in situation of stabilizing the operation of the host vehicle. A third line 1013 may depict an avoidance distance as identified by the vehicle control device according to an embodiment. A fourth line 1015 may depict a avoidance distance as identified by a conventional vehicle control device.

A third graph 1021 may show a roll angle over time in situation of avoiding a collision and in situation of stabilizing the operation of the host vehicle. A fifth line 1023 may depict a roll angle of the host vehicle as identified by the vehicle control device according to an embodiment. A sixth line 1025 may depict a roll angle of the host vehicle as identified by a conventional vehicle control device.

A fourth graph 1031 may show a slip angle of rear wheels over time in situation of avoiding a collision and in situation of stabilizing the operation of the host vehicle. A seventh line 1033 may depict a slip angle of rear wheels as identified by the vehicle control device according to an embodiment. An eighth line 1035 may depict a slip angle of rear wheels as identified by a conventional vehicle control device.

Referring to the first graph 1001, in situation of avoiding a collision, the yaw angular velocity of the host vehicle controlled by the vehicle control device according to an embodiment may be greater than the yaw angular velocity of the host vehicle controlled by the conventional vehicle control device. For example, the yaw angular velocity of the host vehicle controlled by the vehicle control device according to an embodiment may be about 8% greater than the yaw angular velocity of the host vehicle controlled by the conventional vehicle control device. Thus, the vehicle control device according to an embodiment may have a greater collision avoidance performance compared to the conventional vehicle control device.

Referring to the first graph 1001, in situation of stabilizing the operation of the host vehicle after the situation of avoiding a collision, the absolute value of the yaw angular velocity of the host vehicle controlled by the vehicle control device according to an embodiment may be smaller than the absolute value of the yaw angular velocity of the host vehicle controlled by the conventional vehicle control device. For example, the absolute value of the yaw angular velocity of the host vehicle controlled by the vehicle control device according to an embodiment may be about 2% lower than the absolute value of the yaw angular velocity of the host vehicle controlled by the conventional vehicle control device. Thus, the vehicle control device according to an embodiment may have greater operational stability compared to the conventional vehicle control device.

Referring to the second graph 1011, in the situation of avoiding a collision, a lateral avoidance distance of a host vehicle controlled by the vehicle control device according to an embodiment may be greater than a lateral avoidance distance of a host vehicle controlled by the conventional vehicle control device. For example, the lateral avoidance distance of the host vehicle controlled by the vehicle control device according to an embodiment may be about 16 cm greater than the lateral avoidance distance of the host vehicle controlled by the conventional vehicle control device, at a point where the longitudinal position of the host vehicle is about 47 m. Thus, the vehicle control device according to an embodiment may have greater collision avoidance performance compared to the conventional vehicle control device.

Referring to the third graph 1021, in situation of stabilizing the operation of the host vehicle after the situation of avoiding a collision, the absolute value of the roll angle of the host vehicle controlled by the vehicle control device according to an embodiment may be lower than the absolute value of the roll angle controlled by the conventional vehicle control device. For example, the absolute value of the roll angle of the host vehicle controlled by the vehicle control device according to an embodiment may be about 3.8% lower than the absolute value of the roll angle of the host vehicle controlled by the conventional vehicle control device. Therefore, the vehicle control device according to an embodiment may have greater operational stability than the conventional vehicle control device.

Referring to the fourth graph 1031, in the situation where the host vehicle is avoiding a collision, the absolute value of the slip angle of the rear wheel of the host vehicle controlled by the vehicle control device according to an embodiment may be smaller than the absolute value of the slip angle of the rear wheel of the host vehicle controlled by the conventional vehicle control device.

Referring to the fourth graph 1031, in the situation where the operation of the host vehicle is being stabilized after the situation where the host vehicle is avoiding a collision, the slip angle of the rear wheel of the host vehicle controlled by the vehicle control device according to an embodiment may be lower than the slip angle of the rear wheel controlled by the conventional vehicle control device. For example, the slip angle of the rear wheel controlled by the vehicle control device according to an embodiment may be about 14.5% smaller than the slip angle of the rear wheel of the host vehicle controlled by the conventional vehicle control device. Therefore, the vehicle control device according to an embodiment may have higher operation stability than the conventional vehicle control device.

Table 1 below shows an example of comparing a case where a vehicle operating at 80 kph is controlled by the vehicle control device according to an embodiment and a case where the vehicle is controlled by the conventional vehicle control device.

Referring to Table 1, in the situation where the host vehicle is avoiding a collision, the vehicle control device according to an embodiment may improve the collision avoidance performance of the host vehicle by increasing the yaw angular velocity and an avoidance distance compared to the conventional vehicle control device. In the situation where driving of the host vehicle is being stabilized, the vehicle control device according to an embodiment may improve the operational stability of the host vehicle by reducing the yaw angular velocity, the slip angle, and roll angle compared to the conventional vehicle control device.

The exemplary storage medium may be coupled to the processor 1110, and the processor 1110 may read information out of the storage medium and may record information in the storage medium. Alternatively, the storage medium may be integrated with the processor 1110. The processor and the storage medium may reside in an application specific integrated circuit (ASIC). The ASIC may reside within a user terminal. In another case, the processor and the storage medium may reside in the user terminal as separate components.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment. The scope of protection of the present disclosure should be interpreted by the following claims, and all technical ideas within the scope equivalent thereto should be construed as being included in the scope of the present disclosure.

The present technology may identify a control amount of a drive motor that controls a front wheel and a control amount of a drive motor that controls a rear wheel to control a yaw angle and a roll angle in an electric vehicle.

Further, the present technology may adjust a control amount of a drive motor that controls a front wheel and a

TABLE 1

| 80 kph 90deg 0.5 hz SLC | Situation of avoiding collision | | Situation of stabilizing operation of host vehicle | | |
| --- | --- | --- | --- | --- | --- |
| | Yaw angular velocity (deg/s) | Avoidance Distance (cm) | Yaw angular velocity (deg/s) | Slip angle (deg) | Roll angle (deg) |
| Compared to conventional vehicle control device | About 8% increase | About 16 cm increase | About 2% decrease | About 14.5% decrease | About 3.8% decrease |

Figure 11:
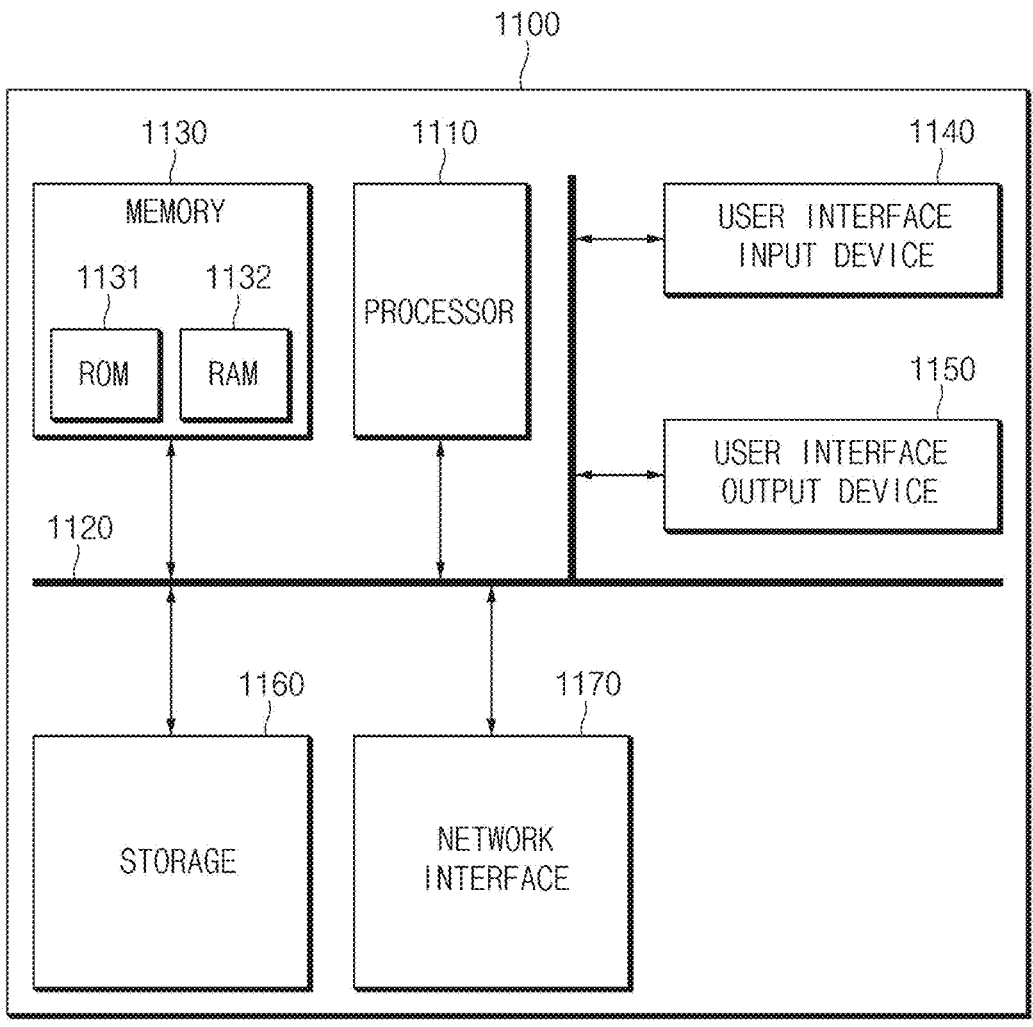
FIG. 11 illustrates a computing system related to a vehicle control device or a vehicle control method according to an embodiment of the present disclosure.

FIG. 11 illustrates a computing system related to a vehicle control device or a vehicle control method according to an embodiment of the present disclosure. Referring to FIG. 11, a computing system 1100 may include at least one processor 1110, a memory 1130, a user interface input device 1140, a user interface output device 1150, storage 1160, and a network interface 1170, which are connected with each other via a bus 1120.

The processor 1110 may be a central processing unit (CPU) or a semiconductor device that processes instructions stored in the memory 1130 and/or the storage 1160. The memory 1130 and the storage 1160 may include various types of volatile or non-volatile storage media. For example, the memory 1130 may include a ROM (Read Only Memory) 1131 and a RAM (Random Access Memory) 1132.

Thus, the operations of the method or the algorithm described in connection with the embodiments disclosed herein may be embodied directly in hardware or a software module executed by the processor 1110, or in a combination thereof. The software module may reside on a storage medium (that is, the memory 1130 and/or the storage 1160) such as a RAM, a flash memory, a ROM, an EPROM, an EEPROM, a register, a hard disk, a removable disk, and a CD-ROM.

control amount of a drive motor that controls a rear wheel to control the drive motors within a specified control amount range in an electric vehicle.

Further, the present technology may improve the collision avoidance performance of an operation for avoiding a collision of an electric vehicle.

Further, the present technology may improve the operational stability of a host vehicle after operation for avoiding a collision in an electric vehicle.

Furthermore, the present technology may improve collision avoidance performance and stability together by adjusting the control amount of a drive motor according to the progress of operation for avoiding a collision and stabilizing the operation of a host vehicle.

In addition, various effects may be provided that are directly or indirectly understood through the disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

27

The invention claimed is:

1. A vehicle control device comprising:
a processor; and
a drive motor;
wherein the processor is configured to:
identify whether a host vehicle avoids a collision based on at least one of whether a collision warning signal is generated, a steering angle of a front wheel included in the host vehicle, or a steering angular velocity of the front wheel, or any combination thereof;
identify, based on identifying that the host vehicle avoids the collision, a first control amount for controlling a yaw angle of the host vehicle based on a speed of the host vehicle;
identify that the host vehicle has stopped the avoiding the collision, based on at least one of whether generation of the collision warning signal is stopped after the host vehicle avoids the collision, the steering angle of the front wheel, the steering angular velocity of the front wheel, or a slip angle of the rear wheel, or any combination thereof;
identify, based on identifying that the host vehicle has stopped avoiding the collision, a feedback control amount which is a control amount of a drive motor for feedback control according to at least one of a lateral acceleration of the host vehicle, a coefficient of friction between ground and the front wheel, a coefficient of friction between the ground and a rear wheel, a speed of the host vehicle, or the steering angle of the front wheel, or any combination thereof;
identify a second control amount for controlling a roll angle of the host vehicle based on the feedback control amount; and
adjust a front wheel control amount or a rear wheel control amount, such that the front wheel control amount and the rear wheel control amount are within a specified control amount range based on the front wheel control amount which is identified according to the first control amount and the second control amount, and is a control amount of a drive motor that controls the front wheel, the rear wheel control amount which is identified according to the first control amount and the second control amount and is a control amount of a drive motor that controls the rear wheel, and the specified control amount range.

2. The vehicle control device of claim 1, wherein the processor is further configured to:
identify a feedforward control amount, which is a control amount of a drive motor for feedforward control according to at least one of the lateral acceleration of the host vehicle, a centripetal force received by the front wheel, or a centripetal force received by the rear wheel, or any combination thereof;
identify the a feedback control amount according to at least one of a target roll angle which is a goal in controlling the roll angle of the host vehicle, or an estimated roll angle for controlling the roll angle of the host vehicle, or any combination thereof; and
identify the second control amount based on a value obtained by adding the feedforward control amount and the feedback control amount.

3. The vehicle control device of claim 2, wherein the processor is further configured to identify the control amount of the drive motor for the feedback control such that the control amount of the drive motor for the feedback control is proportional to a difference between the target roll angle and the estimated roll angle, and a difference between a target roll angular acceleration, which is an amount of change in the target roll angle over time, and an estimated roll angular acceleration, which is the amount of change in the estimated roll angle over time.

4. The vehicle control device of claim 2, wherein the processor is further configured to identify the feedforward control amount such that the feedforward control amount is proportional to the estimated roll angle, which is proportional to the lateral acceleration of the host vehicle and inversely proportional to a value obtained by adding the centripetal force received by the front wheel and the centripetal force received by the rear wheel;
wherein the centripetal force received by the front wheel is inversely proportional to the coefficient of friction between the ground and the front wheel, and proportional to an absolute value of the lateral acceleration of the host vehicle; and
wherein the centripetal force received by the rear wheel is inversely proportional to the coefficient of friction between the ground and the rear wheel, and proportional to the absolute value of the lateral acceleration of the host vehicle.

5. The vehicle control device of claim 2, wherein the processor is further configured to:
identify the target roll angle based on the speed of the host vehicle and the steering angle of the front wheel; and
identify the estimated roll angle based on the lateral acceleration of the host vehicle, the centripetal force received by the front wheel, and the centripetal force received by the rear wheel.

6. The vehicle control device of claim 1, wherein the processor is further configured to:
identify that the host vehicle has stopped avoiding the collision, based on a value identified based on at least one of the steering angle of the front wheel, or the steering angular velocity of the front wheel, or any combination thereof being out of a specified range after the host vehicle avoids the collision, generation of the collision warning signal being stopped, and the slip angle of the rear wheel being greater than a threshold angle;
identify the front wheel control amount based on a value obtained by adding an absolute value of the first control amount and an absolute value of the second control amount, and identify the rear wheel control amount based on a value obtained by subtracting the absolute value of the second control amount from the absolute value of the first control; and
identify the first control amount as the front wheel control amount and the rear wheel control amount, based on a value identified based on at least one of the steering angle of the front wheel, or the steering angular velocity of the front wheel, or any combination thereof being out of the specified range after the host vehicle avoids the collision, the generation of the collision warning signal being not stopped, or the slip angle of the rear wheel being less than or equal to the threshold angle.

7. The vehicle control device of claim 1, wherein the processor is further configured to:
identify the front wheel control amount based on a value obtained by adding an absolute value of the first control amount and an absolute value of the second control amount;
identify the rear wheel control amount based on a value obtained by subtracting the absolute value of the second control amount from the absolute value of the first control amount;

specify the specified control amount range to be less than or equal to a specified control amount value;

adjust the front wheel control amount greater than the specified control amount value to be less than or equal to the specified control amount value if the front wheel control amount is greater than the specified control amount value; and adjust the rear wheel control amount such that a difference between the front wheel control amount and the rear wheel control amount is maintained by adding the rear wheel control amount and a value obtained by subtracting the front wheel control amount after the adjustment from the front wheel control amount before the adjustment.

8. The vehicle control device of claim 6, wherein the processor is configured to identify when the host vehicle avoids the collision and when an operation of the host vehicle is stabilized has ended based on a value, which is identified based on at least one of the steering angle of the front wheel, or the steering angular velocity of the front wheels, or any combination thereof, falling within the specified range, a yaw angular velocity which is the velocity at which the yaw angle changes, falling within a specified yaw angular velocity range continuously for a certain period of time, or generation of a collision warning signal being stopped.

9. The vehicle control device of claim 1, wherein the processor is further configured to:

detect an object different from the host vehicle and located in front of the host vehicle, based on at least one of a LIDAR, or a camera, or any combination thereof; and generate a collision warning signal based on detecting the object.

10. The vehicle control device of claim 1, wherein the processor is further configured to rotate the rear wheel in a direction opposite to a direction in which the front wheel rotates, if the front wheel control amount, or the rear wheel control amount, is within the specified control amount range, and an absolute value of the second control amount is greater than an absolute value of the first control amount.

11. A vehicle control method comprising:

identifying, by a processor, whether a host vehicle avoids a collision based on at least one of whether a collision warning signal is generated, a steering angle of a front wheel included in the host vehicle, or a steering angular velocity of the front wheel, or any combination thereof;

identifying, based on identifying that the host vehicle avoids the collision, a first control amount for controlling a yaw angle of the host vehicle based on a speed of the host vehicle;

identifying that the host vehicle has stopped the avoiding the collision, based on at least one of whether generation of the collision warning signal is stopped after the host vehicle avoids the collision, the steering angle of the front wheel, the steering angular velocity of the front wheel, or a slip angle of the rear wheel, or any combination thereof;

identifying, based on identifying that the host vehicle has stopped avoiding the collision, a feedback control amount which is a control amount of a drive motor for feedback control, according to at least one of a lateral acceleration of the host vehicle, a coefficient of friction between ground and the front wheel, a coefficient of friction between the ground and a rear wheel, a speed of the host vehicle, or the steering angle of the front wheel, or any combination thereof based on at least one of whether generation of the collision warning signal is stopped after the situation where the host vehicle is avoiding the collision, the steering angle of the front wheel, the steering angular velocity of the front wheel, or a slip angle of the rear wheel, or any combination thereof;

identifying a second control amount for controlling a roll angle of the host vehicle based on the feedback control amount; and adjusting a front wheel control amount or a rear wheel control amount, such that the front wheel control amount and the rear wheel control amount fall within a specified control amount range based on the front wheel control amount which is identified according to the first control amount and the second control amount and is a control amount of a drive motor that controls the front wheel, the rear wheel control amount which is identified according to the first control amount and the second control amount and is a control amount of a drive motor that controls the rear wheel, and the specified control amount range.

12. The vehicle control method of claim 11, wherein identifying the second control amount includes:

identifying a feedforward control amount, which is a control amount of a drive motor for feedforward control according to at least one of the lateral acceleration of the host vehicle, a centripetal force received by the front wheel, or a centripetal force received by the rear wheel, or any combination thereof;

identifying the feedback control amount according to at least one of a target roll angle which is a goal in controlling the roll angle of the host vehicle, or an estimated roll angle for controlling the roll angle of the host vehicle, or any combination thereof; and identifying the second control amount based on a value obtained by adding the feedforward control amount and the feedback control amount.

13. The vehicle control method of claim 12, wherein identifying the feedback control amount includes identifying the control amount of the drive motor for the feedback control such that the control amount of the drive motor for the feedback control is proportional to a difference between the target roll angle and the estimated roll angle, and a difference between a target roll angular acceleration, which is an amount of change in the target roll angle over time, and an estimated roll angular acceleration, which is the amount of change in the estimated roll angle over time.

14. The vehicle control method of claim 12, wherein identifying the feedforward control amount includes identifying the feedforward control amount such that the feedforward control amount is proportional to the estimated roll angle, which is proportional to the lateral acceleration of the host vehicle and inversely proportional to a value obtained by adding the centripetal force received by the front wheel and the centripetal force received by the rear wheel;

wherein the centripetal force received by the front wheel is inversely proportional to the coefficient of friction between the ground and the front wheel, and proportional to an absolute value of the lateral acceleration of the host vehicle; and wherein the centripetal force received by the rear wheel is inversely proportional to the coefficient of friction between the ground and the rear wheel, and proportional to an absolute value of the lateral acceleration of the host vehicle.

15. The vehicle control method of claim 12, wherein identifying the feedback control amount includes:

identifying the target roll angle based on the speed of the host vehicle and the steering angle of the front wheel; and identifying the estimated roll angle based on the lateral acceleration of the host vehicle, the centripetal force received by the front wheel, and the centripetal force received by the rear wheel.

16. The vehicle control method of claim 11, further comprising:

identifying that the host vehicle has stopped avoiding the collision, based on a value identified based on at least one of the steering angle of the front wheel, or the steering angular velocity of the front wheel, or any combination thereof being out of a specified range after the host vehicle avoids the collision, generation of the collision warning signal being stopped, and the slip angle of the rear wheel being greater than a threshold angle;

identifying the front wheel control amount based on a value obtained by adding an absolute value of the first control amount and an absolute value of the second control amount, and identifying the rear wheel control amount based on a value obtained by subtracting the absolute value of the second control amount from the absolute value of the first control; and identifying the first control amount as the front wheel control amount and the rear wheel control amount based on a value identified based on at least one of the steering angle of the front wheel, or the steering angular velocity of the front wheel, or any combination thereof being out of the specified range after the host vehicle avoids a collision, the generation of the collision warning signal being not stopped, or the slip angle of the rear wheel being less than or equal to the threshold angle.

17. The vehicle control method of claim 11, wherein adjusting the front wheel control amount, or the rear wheel control amount includes:

identifying the front wheel control amount based on a value obtained by adding an absolute value of the first control amount and an absolute value of the second control amount;

identifying the rear wheel control amount based on a value obtained by subtracting the absolute value of the second control amount from the absolute value of the first control amount;

specifying the specified control amount range to be less than or equal to a specified control amount value;

adjusting the front wheel control amount greater than the specified control amount value to be less than or equal to the specified control amount value if the front wheel control amount is greater than the specified control amount value; and adjusting the rear wheel control amount such that a difference between the front wheel control amount and the rear wheel control amount is maintained by adding the rear wheel control amount and a value obtained by subtracting the front wheel control amount after the adjustment from the front wheel control amount before the adjustment.

18. The vehicle control method of claim 16, further comprising:

identifying when the host vehicle avoids the collision and when an operation of the host vehicle is stabilized has ended based on a value, which is identified based on at least one of the steering angle of the front wheel, or the steering angular velocity of the front wheels, or any combination thereof, falling within the specified range, a yaw angular velocity which is the velocity at which the yaw angle changes, falling within a specified yaw angular velocity range continuously for a certain period of time, or generation of a collision warning signal being stopped.

19. The vehicle control method of claim 11, wherein identifying whether the host vehicle is avoiding the collision includes:

detecting an object different from the host vehicle and located in front of the host vehicle, based on at least one of a LIDAR, or a camera, or any combination thereof; and generating a collision warning signal based on detecting the object.

20. The vehicle control method of claim 11, further comprising:

rotating the rear wheel in a direction opposite to a direction in which the front wheel rotates, if the front wheel control amount, or the rear wheel control amount, falls within the specified control amount range, and an absolute value of the second control amount is greater than an absolute value of the first control amount.

* * * * *